US009052894B2

(12) United States Patent
Moore et al.

(10) Patent No.: US 9,052,894 B2
(45) Date of Patent: Jun. 9, 2015

(54) API TO REPLACE A KEYBOARD WITH CUSTOM CONTROLS

(75) Inventors: Bradford Allen Moore, Sunnyvale, CA (US); Stephen W. Swales, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 348 days.

(21) Appl. No.: 12/789,674

(22) Filed: May 28, 2010

(65) Prior Publication Data

US 2011/0179373 A1 Jul. 21, 2011

Related U.S. Application Data

(60) Provisional application No. 61/295,676, filed on Jan. 15, 2010.

(51) Int. Cl.
*G06F 3/0488* (2013.01)
*G06F 1/32* (2006.01)
*G06F 3/038* (2013.01)

(52) U.S. Cl.
CPC .............. *G06F 1/3203* (2013.01); *G06F 3/038* (2013.01); *G06F 3/04886* (2013.01)

(58) Field of Classification Search
CPC .......................... G06F 3/04842; G06F 3/04886
USPC ......................................................... 715/771
See application file for complete search history.

(56) References Cited

U.S. PATENT DOCUMENTS

| 6,281,886 | B1 * | 8/2001 | Ranieri .......................... 345/173 |
| 7,030,863 | B2 | 4/2006 | Longe et al. ................... 345/173 |
| 2008/0072143 | A1 | 3/2008 | Assadollahi ................... 715/261 |
| 2008/0082934 | A1 | 4/2008 | Kocienda et al. ............. 715/773 |
| 2009/0225041 | A1 | 9/2009 | Kida et al. |

FOREIGN PATENT DOCUMENTS

| CN | 101535938 | 9/2009 | |
| EP | 1 443 395 A2 | 8/2004 | .............. G06F 3/033 |
| EP | 1443395 A2 | 8/2004 | |
| TW | 200634623 A | 10/2006 | |

(Continued)

OTHER PUBLICATIONS

Nilsson et al., "Design patterns for user interface for mobile applications," Advances in Engineering Software, Elsevier Science, Oxford, GB, vol. 40, No. 12, Dec. 1, 2009, pp. 1318-1328.

(Continued)

*Primary Examiner* — Alvin Tan
(74) *Attorney, Agent, or Firm* — Downey Brand LLP

(57) ABSTRACT

A method and system for display a user interface object. A user interface object for receiving user input to the application program is determined and the user interface object is displayed on the display. A first set of characteristics of the user interface object is control in accordance with the application program. The first set of characteristics include appearance of the user interface object and user interactions with the application program via the user interface object. A second set of characteristics of the user interface different form the first set of characteristics are controlled in accordance with the control program. The second set of characteristics include the display state of the user interface object.

20 Claims, 17 Drawing Sheets

(56) References Cited

FOREIGN PATENT DOCUMENTS

| TW | 200849076 A | 12/2008 |
|----|-------------|---------|
| WO | WO2008030879 | 3/2008 |

OTHER PUBLICATIONS

European Search Report dated Apr. 18, 2011, received in European Application No. 11151082.2, which corresponds to U.S. Appl. No. 12/789,674.

International Search Report and Written Opinion dated Apr. 21, 2011, received in International Application No. PCT/US2011/021236, which corresponds to U.S. Appl. No. 12/789,674.

International Search Report and Written Opinion dated Jun. 1, 2011, received in International Application No. PCT/US2011/020404, which corresponds to U.S. Appl. No. 12/789,684.

Corresponding TW App. No. 100101495, Office Action dated Nov. 4, 2013.

Corresponding KR App. No. 10-2012-7021231, Notice of Preliminary Rejection dated Oct. 16, 2013.

Chinese Patent Application No. 201180009942.0—Office Action dated Sep. 29, 2014.

\* cited by examiner

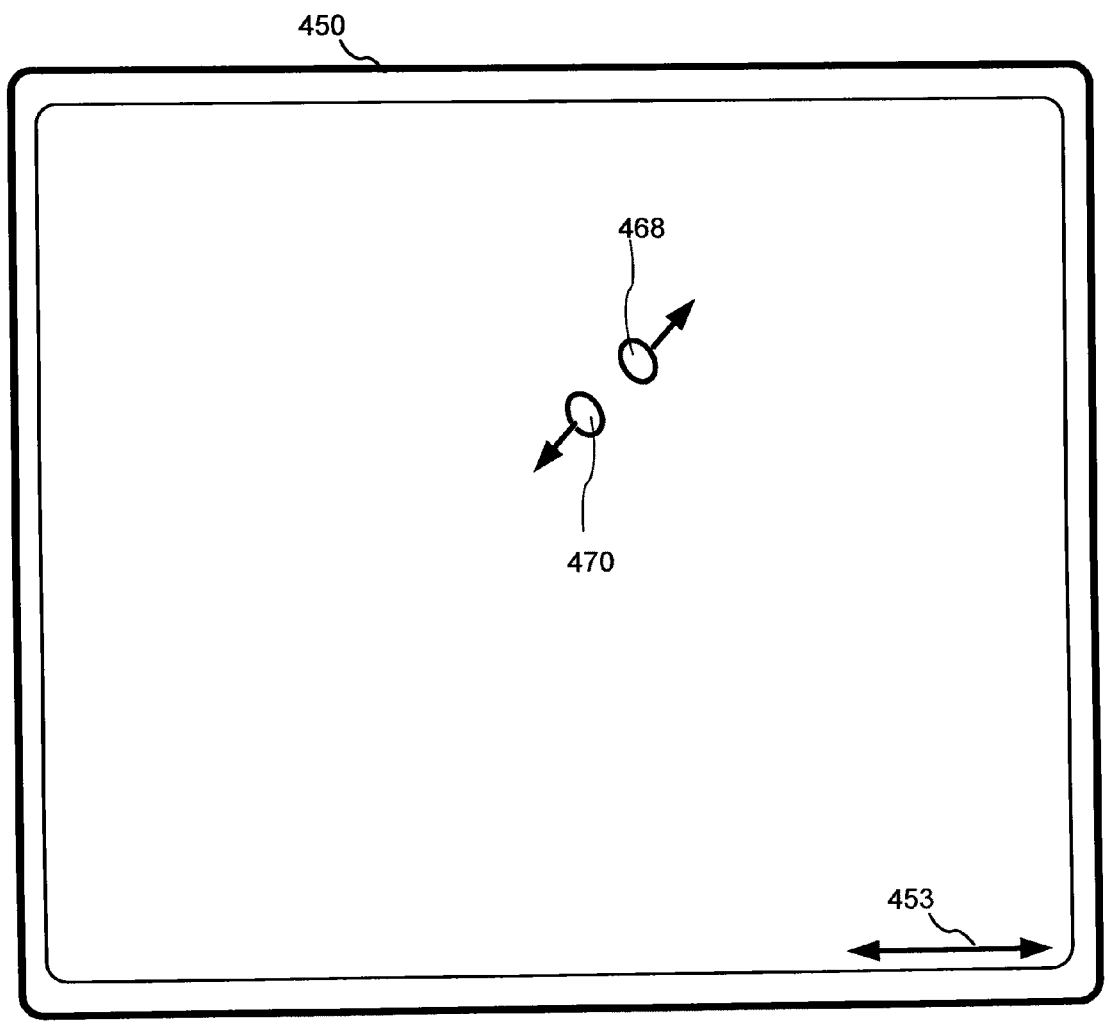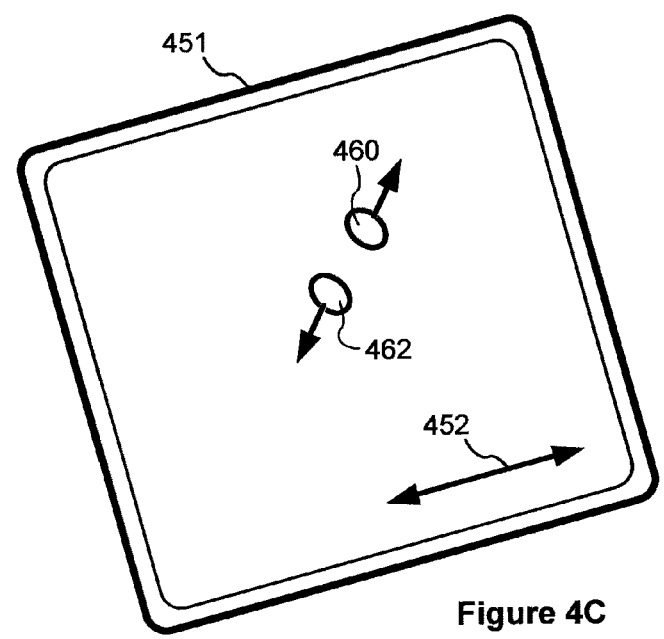
Figure 4C

```
(void)viewDidLoad
{
  [super viewDidLoad];

// Setting up a view which allows the user to input a date and a location.
  CGRect frame = CGRectMake(0, 0, 300, 40);
  UITextField *dateField = [[UITextField alloc] initWithFrame:frame];      ⎯⎯ 602
  UITextField *dateField2 = [[UITextField alloc] initWithFrame:frame];     ⎯⎯ 603
  [self.view addSubview:dateField];
  [self.view addSubview:dateField2];
                                            606
610      608                                 ↓
  ↓       ↓                                                                ⎯⎯ 604
    dateField.inputView = [MyDatePickerView sharedCustomDatePicker];
614      612       616
  ↓       ↓         ↓                                                      ⎯⎯ 605
    dateField2.accessoryView = [MyDatePicker View View1 View2 View3];

[dateField release];
  [dateField2 release];

frame.origin.y += 50;
  UITextField *locationField = [[UITextField alloc] initWithFrame:frame];
  [self.view addSubview:locationField];
  [locationField release];
}
```

Figure 6

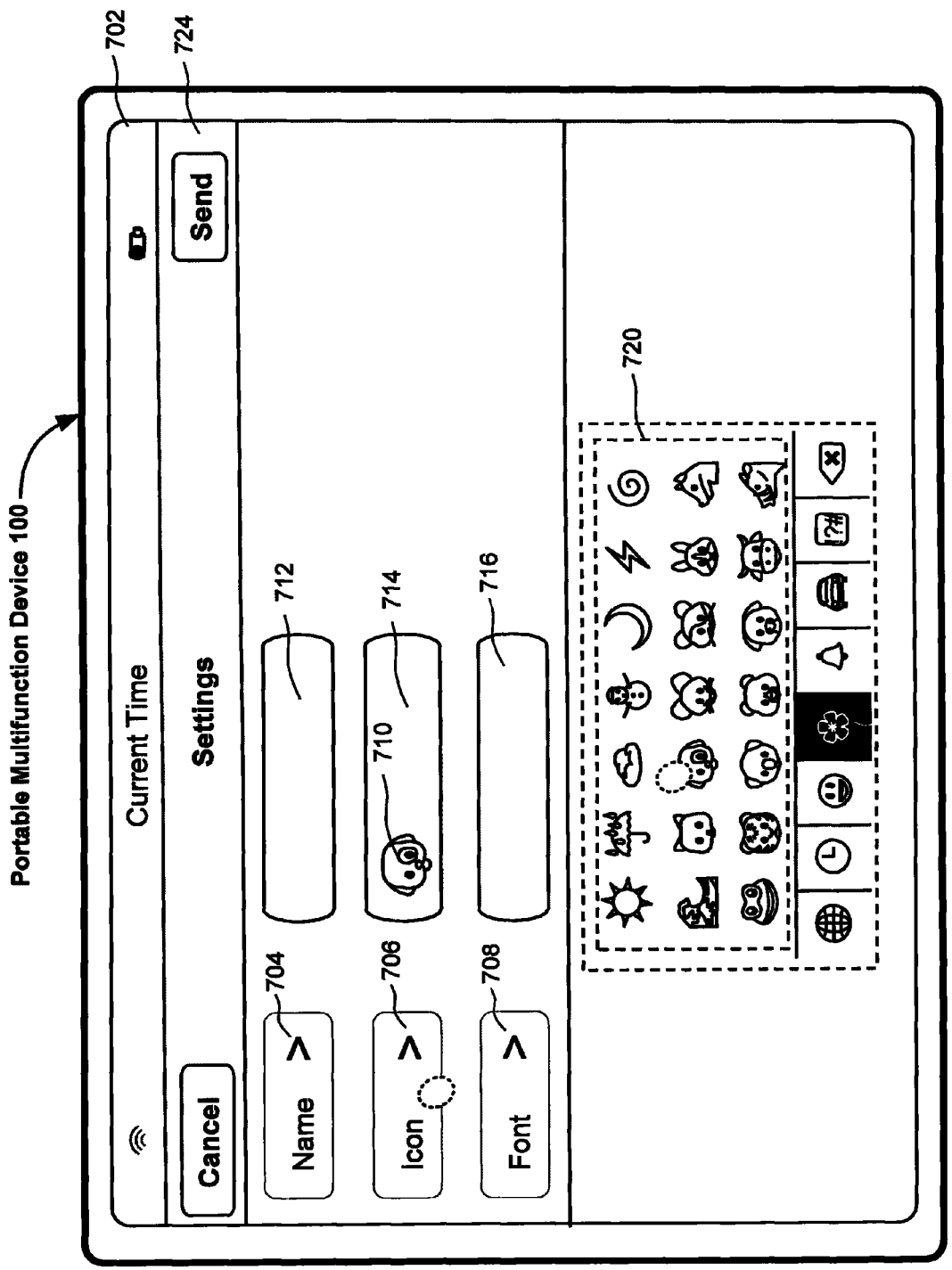

API TO REPLACE A KEYBOARD WITH CUSTOM CONTROLS

RELATED APPLICATIONS

This application claims priority to U.S. Provisional Application Ser. No. 61/295,676, filed Jan. 15, 2010, entitled "API to Replace a Keyboard with Custom Controls," which is incorporated herein by reference in its entirety.

This application is related to the following applications: (1) U.S. patent application Ser. No. 12/789,658, filed May 28, 2010, "Automatic Keyboard Layout Determination,"; (2) U.S. patent application Ser. No. 12/789,666, filed May 28, 2010, "Automatically Displaying and Hiding an On-Screen Keyboard,"; and (3) U.S. patent application Ser. No. 12/789,684, filed May 28, 2010, "System and Method for Issuing Commands to Applications Based on Contextual Information." Each of these applications is incorporated by reference in its entirety.

TECHNICAL FIELD

The disclosed embodiments relate generally to electronic devices with touch-sensitive surfaces, and more particularly, to electronic devices with touch-sensitive surfaces that display user interfaces.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Some electronic devices (e.g., a mobile phone, a portable game console, etc.) provide a user interface that includes an on-screen keyboard (also called a soft keyboard) that allows a user to enter text into the user interface by touching virtual keys displayed on a touch-sensitive display device (sometimes called a touch screen display). Typically, the on-screen keyboard is a system keyboard that is provided by the operating system of the electronic device. In addition to providing the system keyboard, the operating system of the device handles the display behavior of the system keyboard. A application developer may want to create custom user interfaces because the standard interfaces don't have visual appearances or functionalities that are desired by the application developer. For example, on a small screen, an on-screen keyboard may obscure valuable portions of a displayed application. In another example, a game developer may want to have a custom game interface that includes game related functionality instead of a standard user interface that does not include game related functionality.

Existing methods for creating custom user interfaces are time consuming and inefficient because they require an application developer to specify all aspects of a custom user interface, including the display behavior of the custom user interface.

SUMMARY

Accordingly, there is a need for computing devices with faster, more efficient methods and interfaces for displaying custom user interfaces with the display behavior of a standard user interface. Such methods and interfaces may complement or replace conventional methods for displaying custom user interfaces with the display behavior of a standard user interface. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is provided to display a custom user interface in accordance with at least some of the display behaviors of a standard system user interface. The application programming interface (API) for the system provides functions that allow a programmer to replace the appearance and functionality of a standard user interface object. As a result, the standard user interface object will appear and function in accordance with the instructions corresponding to the custom user interface while retaining all other functionality of the standard user interface such as display behavior. Such methods enhance the user's experience as all user interfaces whether custom or standard have behaviors that are consistent with the standard input interface provided by the device. Such methods also a programmer to create custom user interfaces without having to specify at least some of the display behaviors of the custom user interfaces, thereby decreasing application development time.

In accordance with some embodiments, a computer-implemented method is performed at an electronic device with one or more processors, a touch-screen display and memory storing one or more programs including an application program and a control program. The method includes determining a user interface object for receiving user input to the application program and displaying the user interface object on the display. The method also includes, in accordance with the application program, controlling a first set of characteristics of the user interface object. The first set of characteristics include appearance of the user interface object and user interactions with the application program via the user interface object. The method further includes, in accordance with the control program, controlling a second set of characteristics of the user interface object different from the first set of characteristics, wherein the second set of characteristics include display state of the user interface object.

In accordance with some embodiments, an electronic device includes a touch screen display, one or more processors, memory, and one or more programs; the one or more programs are stored in the memory and configured to be executed by the one or more processors and the one or more programs include instructions for performing the operations of any of the methods described above. In accordance with some embodiments, a graphical user interface on an electronic device with a touch screen display, a memory, and one or more processors to execute one or more programs stored in the memory includes one or more of the elements displayed in any of the methods described above, which are updated in response to inputs, as described in any of the methods above. In accordance with some embodiments, a computer readable storage medium has stored therein instructions which when executed by an electronic device with a touch screen display, cause the device to perform the operations of any of the methods described above. In accordance with some embodiments, an electronic device includes: a touch screen display; and means for performing the operations of any of the methods described above. In accordance with some embodiments, an information processing apparatus, for use in an electronic device with a touch screen display, includes means for performing the operations of any of the methods described above.

Thus, electronic devices with touch screen displays are provided with faster, more efficient methods and interfaces for displaying custom user interfaces with the display behavior of a standard user interface, thereby increasing the effectiveness, efficiency, and user satisfaction with such devices. Such methods and interfaces may complement or replace conventional methods for displaying custom user interfaces with the display behavior of a standard user interface.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIG. 4C illustrates an exemplary user interface for a multifunction device with a touch-sensitive surface that is separate from the display in accordance with some embodiments.

FIG. 6 illustrates exemplary pseudo code for associating a custom user interface with display behavior of a standard system object.

FIGS. 7A-7E illustrate exemplary user interfaces in accordance with some embodiments.

DESCRIPTION OF EMBODIMENTS

Figure 1A:
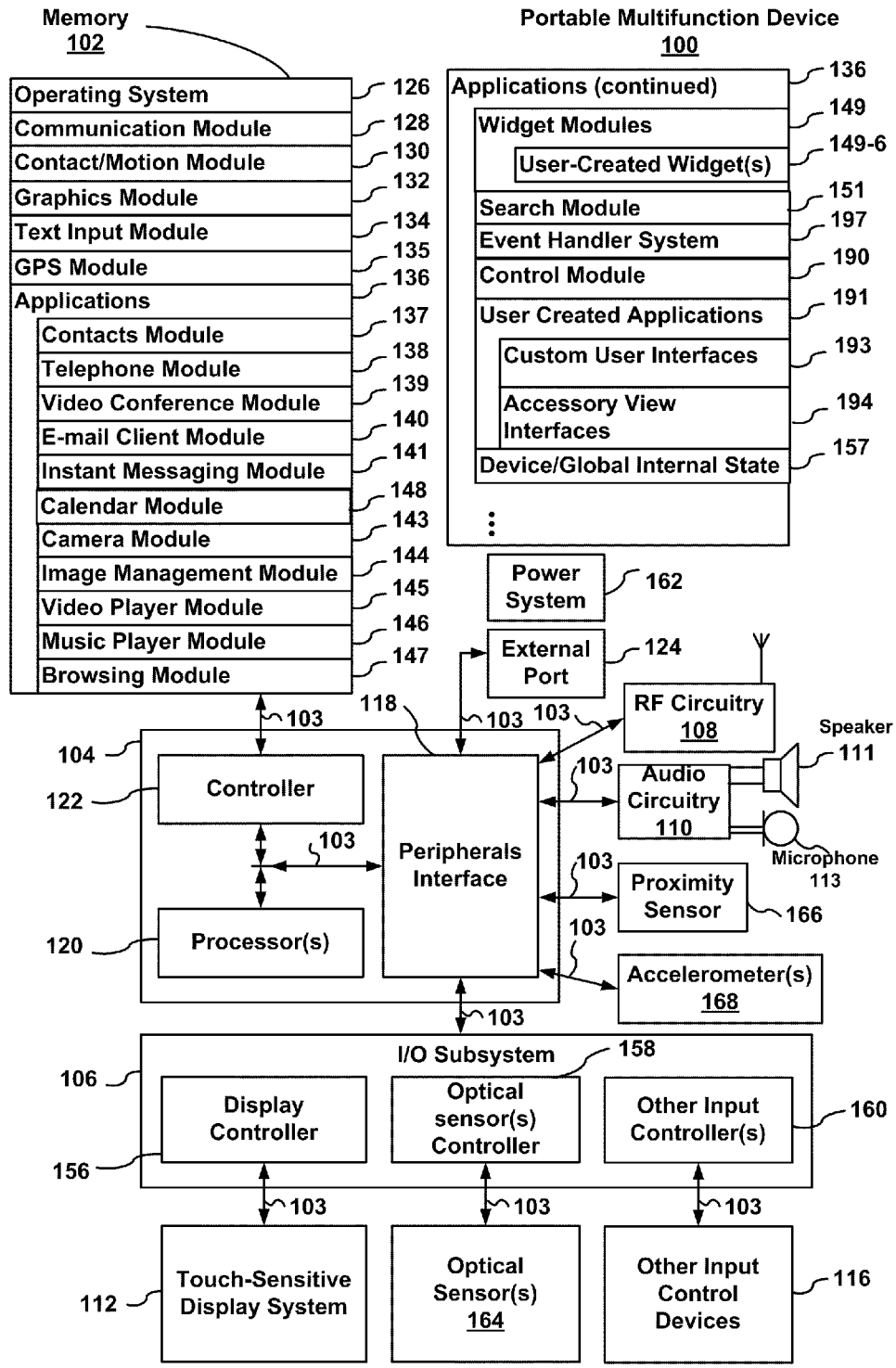
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone® and iPod Touch® devices from Apple Inc. of Cupertino, Calif. Other portable devices such as laptops or tablet computers with touch-sensitive surfaces (e.g., touch screen displays and/or touch pads) may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

The user interfaces may include one or more soft keyboard or on-screen keyboards embodiments. As used herein, "soft keyboard" and "on-screen keyboard" are used interchangeably. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, Ser. No. 11/459,615, "Touch Screen Keyboards For Portable Electronic Devices," filed Jul. 24, 2006, and 61/210,331, "Smart Keyboard Management for a Multifunction Device with a Touch Screen Display," filed Mar. 16, 2009 the contents of which are hereby incorporated by reference in their entireties. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
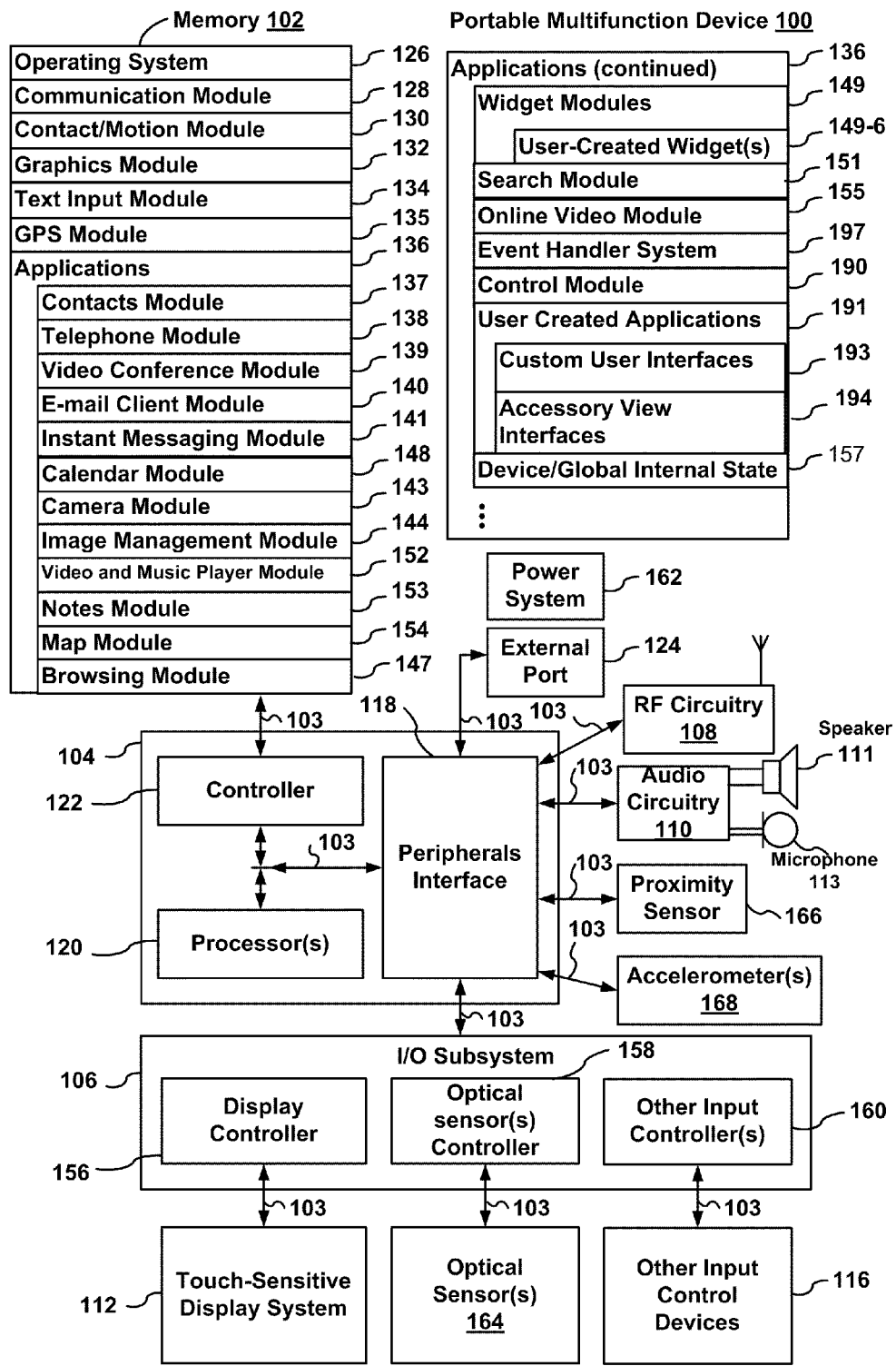

Attention is now directed toward embodiments of portable devices with touch-sensitive displays. FIGS. 1A and 1B are block diagrams illustrating portable multifunction devices 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g. 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2). A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from portable device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a resolution in excess of 100 dpi. In some embodiments, the touch screen has a resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

In some embodiments, device 100 may include a physical or virtual wheel (e.g., a click wheel) as input control device 116. A user may navigate among and interact with one or more graphical objects (e.g., icons) displayed in touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by input controller 160 as well as one or more of the modules and/or sets of instructions in memory 102. For a virtual click wheel, the click wheel and click wheel controller may be part of touch screen 112 and display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
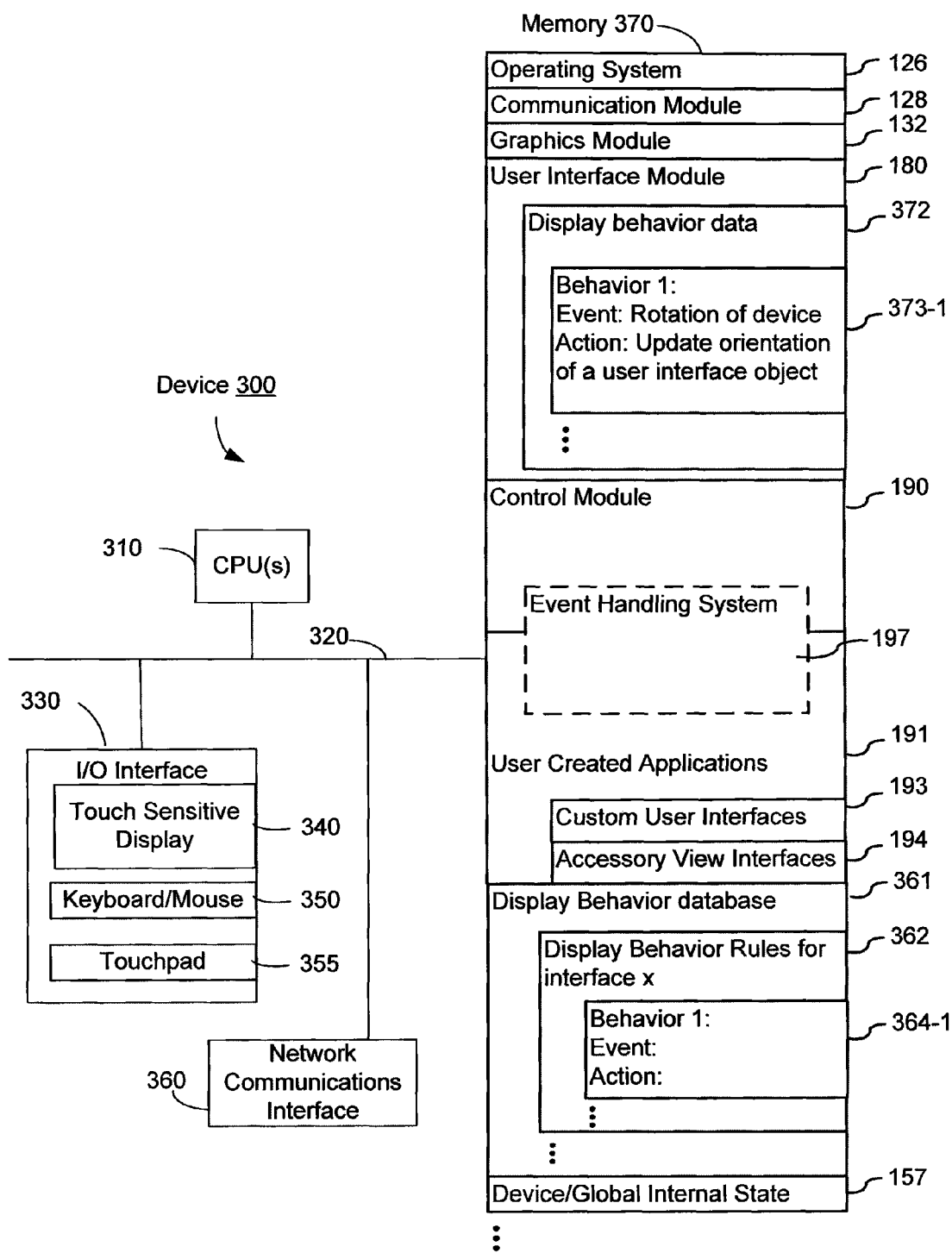
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a workout support module;
- a camera module 143 for still and/or video images;
- an image management module 144;
- a video player module 145;
- a music player module 146;
- a browser module 147;
- a calendar module 148;
- widget modules 149, which may include one or more of: weather widget 149-1, stocks widget, calculator widget, alarm clock widget, dictionary widget 149-5, and other widgets obtained by the user, as well as user-created widgets 149-6;
- widget creator module for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, (e.g., stored in application internal state of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, the e-mail client module 140 includes executable instructions to create, send, receive, and manage e-mail in response to user instructions. In conjunction with image management module 144, the e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player, such as an iPod (trademark of Apple Inc.).

In conjunction with RF circuitry 108, touch screen 112, display system controller 156, contact module 130, graphics module 132, and text input module 134, the browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget, calculator widget, alarm clock widget, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes executable instructions that allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

As discussed in greater detail in the discussion of FIG. 3, the control module 190 determines the display behavior of a user interface object.

As discussed in greater detail in the discussion of FIG. 3, user created applications 191 are applications that include custom user interfaces 193 and/or accessory view interfaces 194.

Figure 5A:
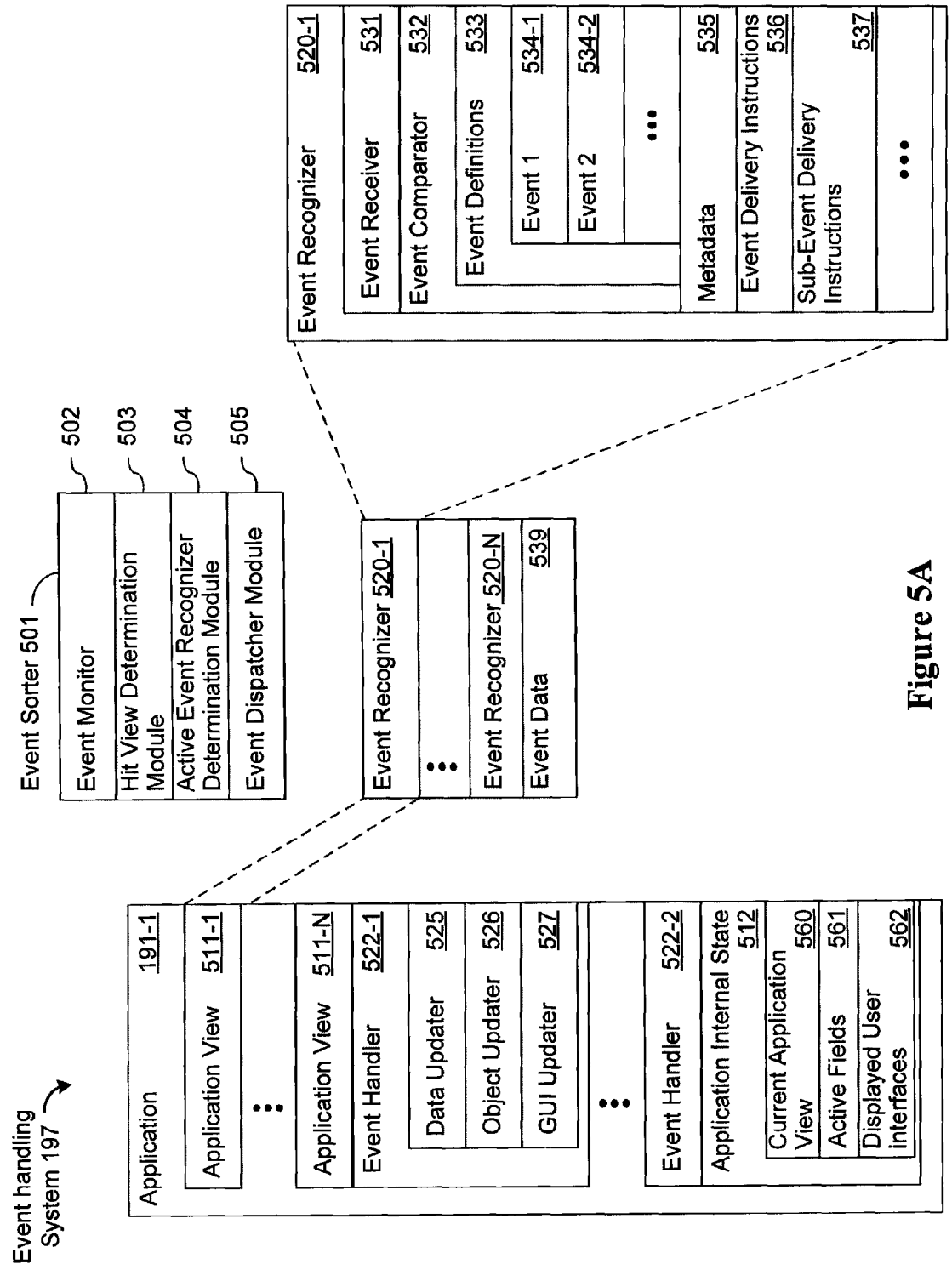
FIGS. 5A and 5B illustrate an exemplary event handler system in accordance with some embodiments.
Figure 5B:
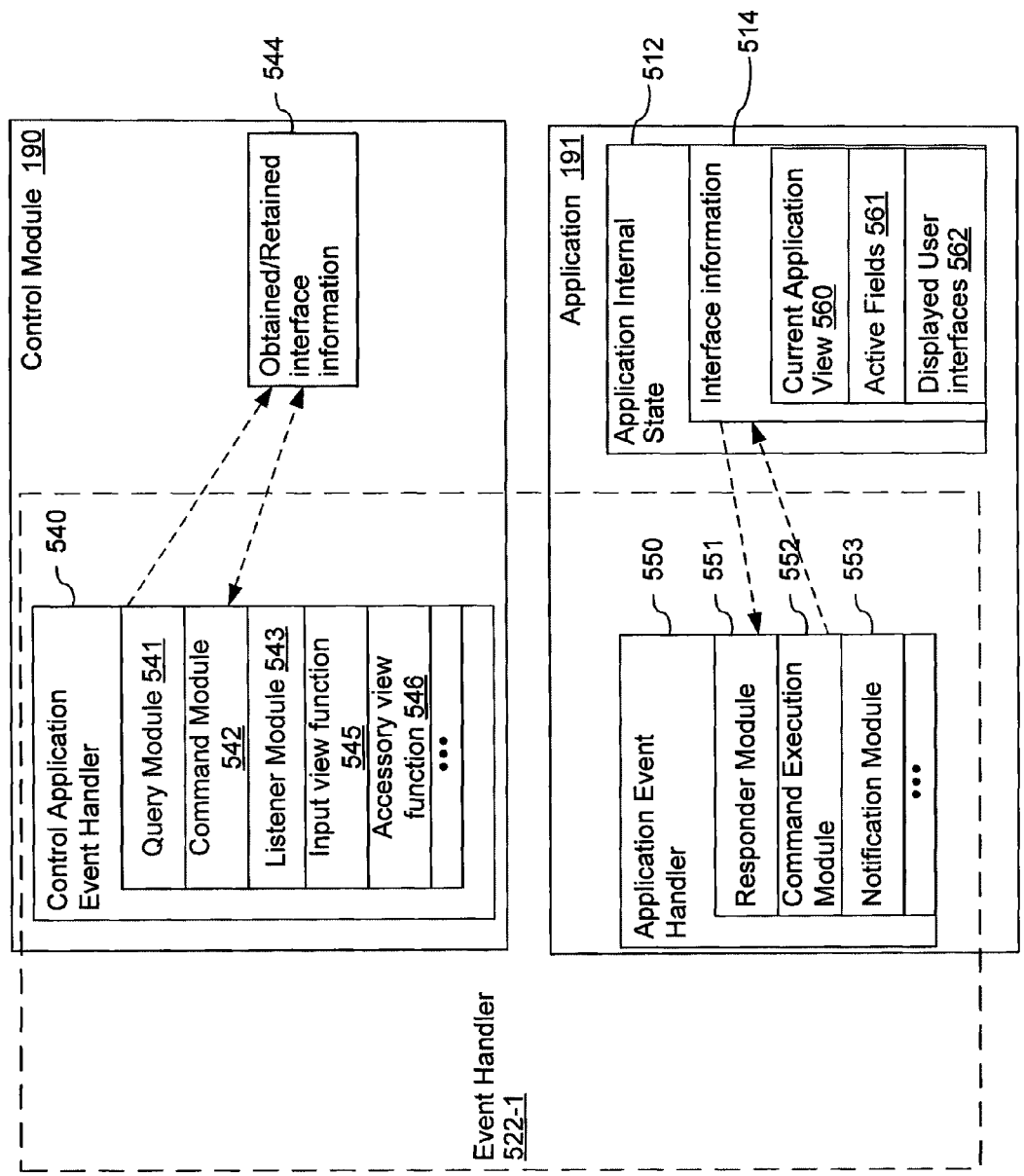

As discussed in greater detail in the discussion of FIGS. 5A and 5B, the event handler system handles event messages between the control module 190 and the user created applications 191.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen 112 and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 2:
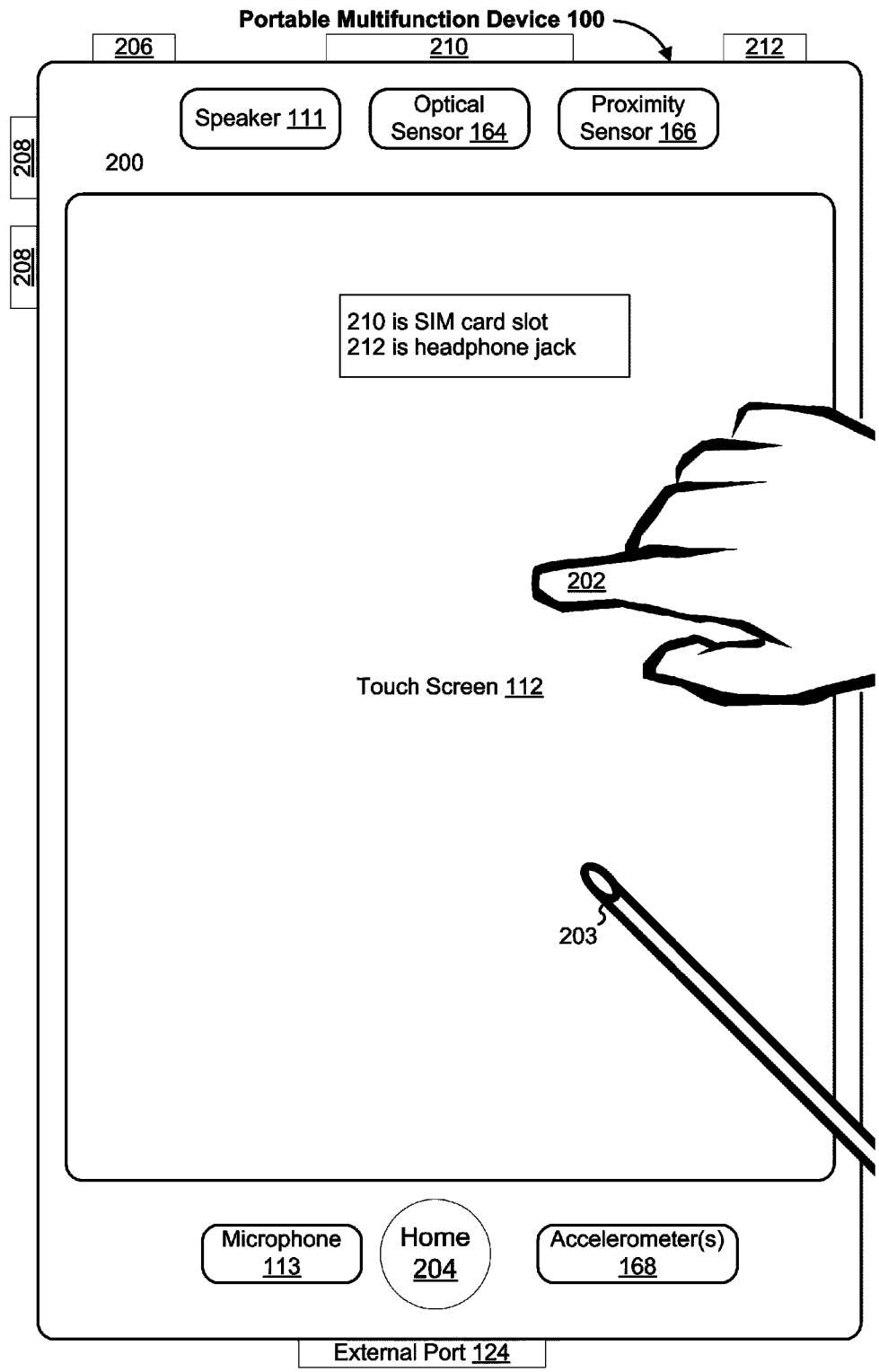
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, the menu button 204 may be used to navigate to any application 136 in a set of applications that may be executed on device 100. Alternatively, in some embodiments, the menu button is implemented as a soft key in a GUI in touch screen 112.

In one embodiment, device 100 includes a touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes an input/output (I/O) interface 330 comprising a display 340, which is typically a touch screen display. The I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in the memory 102 of portable multifunction device 100 (FIG. 1), or a subset thereof. In some embodiments, memory 370 or the computer readable storage medium of memory 370 store the following programs, modules and data structures, or a subset thereof including: an operating system 126, communication module 128, graphics module 132, user interface module 180, control module 190, user created applications 191 and event handling system 197.

The operating system 126 includes procedures for handling various basic system services and for performing hardware dependent tasks.

The communication module 128 facilitates communication with other devices via the one or more communication network interfaces 360 (wired or wireless) and one or more communication networks, such as the Internet, other wide area networks, local area networks, metropolitan area networks, cellular networks, and so on.

The graphics module 132 displays graphics on the touch screen 112 or other display; the graphics include various user interfaces such as on-screen keyboards, virtual game controllers, sliders, pickers, wheels and virtual knobs.

The user interface module 180 receives commands from the user via the input devices (e.g., touch screen 112, keyboard/mouse 350, touchpad 355). The user interface module 180 also generates user interface objects in the display device 340. In some embodiments, the user interface module 180 provides on-screen keyboards for entering text to various applications (e.g., contacts 137, e-mail 140, IM 141, browser 147, and any other application that needs text input). In some embodiments, the user interface module 180 provides on-screen keyboard display behavior data 372 to the control module 190 and to the display behavior database 361. In some embodiments, the display behavior data 372 includes display behavior rules 373-1 for a user interface object. Each rule 373-1 specifies an event and the corresponding display action. For example, a rule 373-1 may specify when the event of rotating the device occurs, the corresponding display action is updating the orientation of the displayed user interface object.

The user created applications 191 include custom user interfaces 193 and accessory view interfaces 194. A custom user interface is created by a programmer of a user created application 191 and is specific to the user created application 191. For example, the custom user interfaces could be virtual knobs, virtual wheels, virtual game controllers, sliders, pickers, selection boxes and on-screen keyboards. In some embodiments, a custom user interface replaces a standard interface. An accessory view interface 194 is a user interface that display icons corresponding to graphical user interfaces. An accessory view allows a programmer to associate more than one user interface with a field. For example, for an input field, a user may associate a custom on-screen keyboard, the standard on-screen keyboard, a font picker, and a symbol picker. The user interfaces associated with an accessory view may be standard user interfaces (e.g., standard on-screen keyboard) or custom user interfaces. A programmer may want to associate multiple user interfaces with an input field to provide a user with multiple input options. For example, for a text field, the accessory view interfaces may include an on-screen keyboard, font picker and icon selector. In this example, a user may select the on-screen keyboard, input some text into the field, select the font picker, change the font of the entered text and select the icon to insert symbols into the text field.

The display behavior database 361 includes display behavior data 362 for user interface objects. In some embodiments, the display behavior data 362 includes behavior data for standard interface objects and custom user interface objects. The display behavior for a respective interface object may include a set of rules 364-1 defining events and actions. For example, for an on-screen keyboard, an event may be rotating the device and the action may be updating the on-screen keyboard to a position and orientation corresponding to the new orientation of the device. The event includes some sort of user action with respect to the device. For example, the user action may include rotating the device, selecting an icon or area, jiggling the device, coming into close proximity to the device or smacking the device. The action is the corresponding display action of an object. In some embodiments, the action also includes the location to display an object. For example, the action includes, displaying the object, hiding the object and redisplaying the object at a different position and orientation.

The event handling system 197 is discussed further in the discussion of FIGS. 5A and 5B. The event handling system 197 handles messages between the control module 190 and the user created applications 191. The event handling system 197 (in the device 300) may be implemented in various alternate embodiments within the control module 190 and/or the applications 191, as described herein.

The control module 190 displays custom user interfaces in accordance with display behavior of a standard interface object. A standard user object is a user interface that is provided by the user interface module 180 to one or more modules on the device 300. The standard interface object is not specific to any application. Generally, users cannot modify the standard interface objects.

In some embodiments, the control module 190 detects whether a custom user interface is associated with at least some display behavior of a standard user object. In some embodiments, in conjunction with the event handling system 197, the control module 190 detects whether a custom user interface is associated with at least some display behavior of a standard user object. For example, the control module 190 may receive a message from the event handling system 197 indicating that an application is displaying a custom user interface that has been associated with display behavior for a standard interface object. In some embodiments, the control module 190 detects whether a standard user object has had its appearance and functionality replaced by a custom user interface.

In some embodiments, the control module 190 sends display instructions to the application to display the custom user interface in accordance with the display behavior of a standard user object. In some embodiments, the display instructions are sent through the event handling system 197. Display behavior can include: when an object is displayed or hidden, when a custom object is displayed or hidden, where the object is displayed, and how the object behaves when a user interacts with the device. In some embodiments, user interactions include rotating the device, jiggling the device, slapping the device, coming into close proximity to the device and answering a call. In some embodiments, the control module 190 works in conjunction with the user interface module 180, the event handling system 197, the graphics module 132, the accelerometers 168, the proximity sensors 166 and contact/motion module to display a custom user interface. In some embodiments, the standard user interface objects and custom user interface objects associated with at least some display behavior of a standard user interface objects are displayed in accordance with display behavior of a user interface object described in U.S. patent application Ser. No. 12/789,666, "Automatically Hiding and Displaying an On-screen Keyboard," filed May 28, 2010.

In some embodiments, the control module 190 retrieves display behavior data (e.g., 372, 362) from the display behavior database 361 or the user interface module 180.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on a portable multifunction device 100.

Figure 4A:
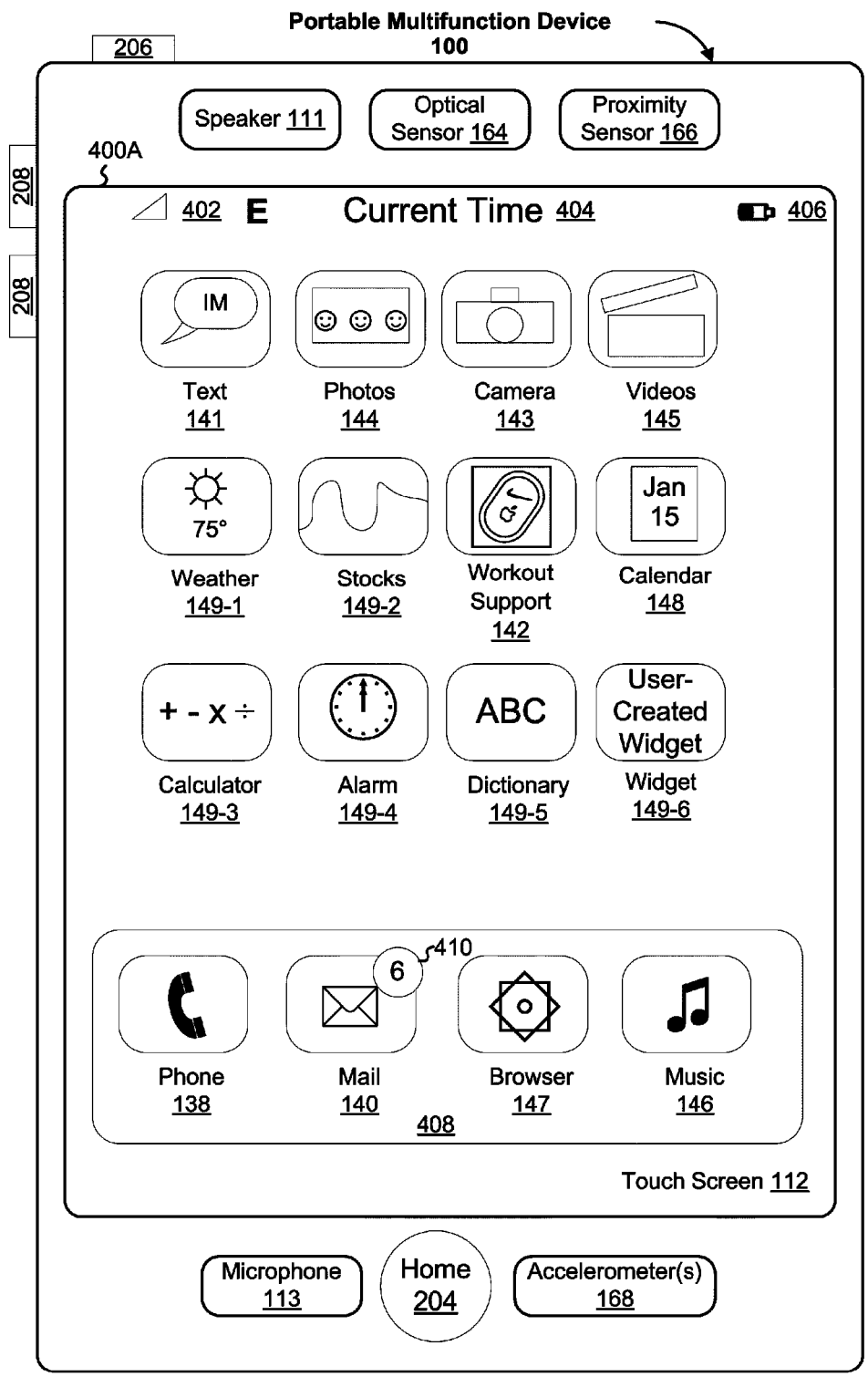
FIGS. 4A and 4B illustrate exemplary user interfaces for a menu of applications on a portable multifunction device in accordance with some embodiments.
Figure 4B:
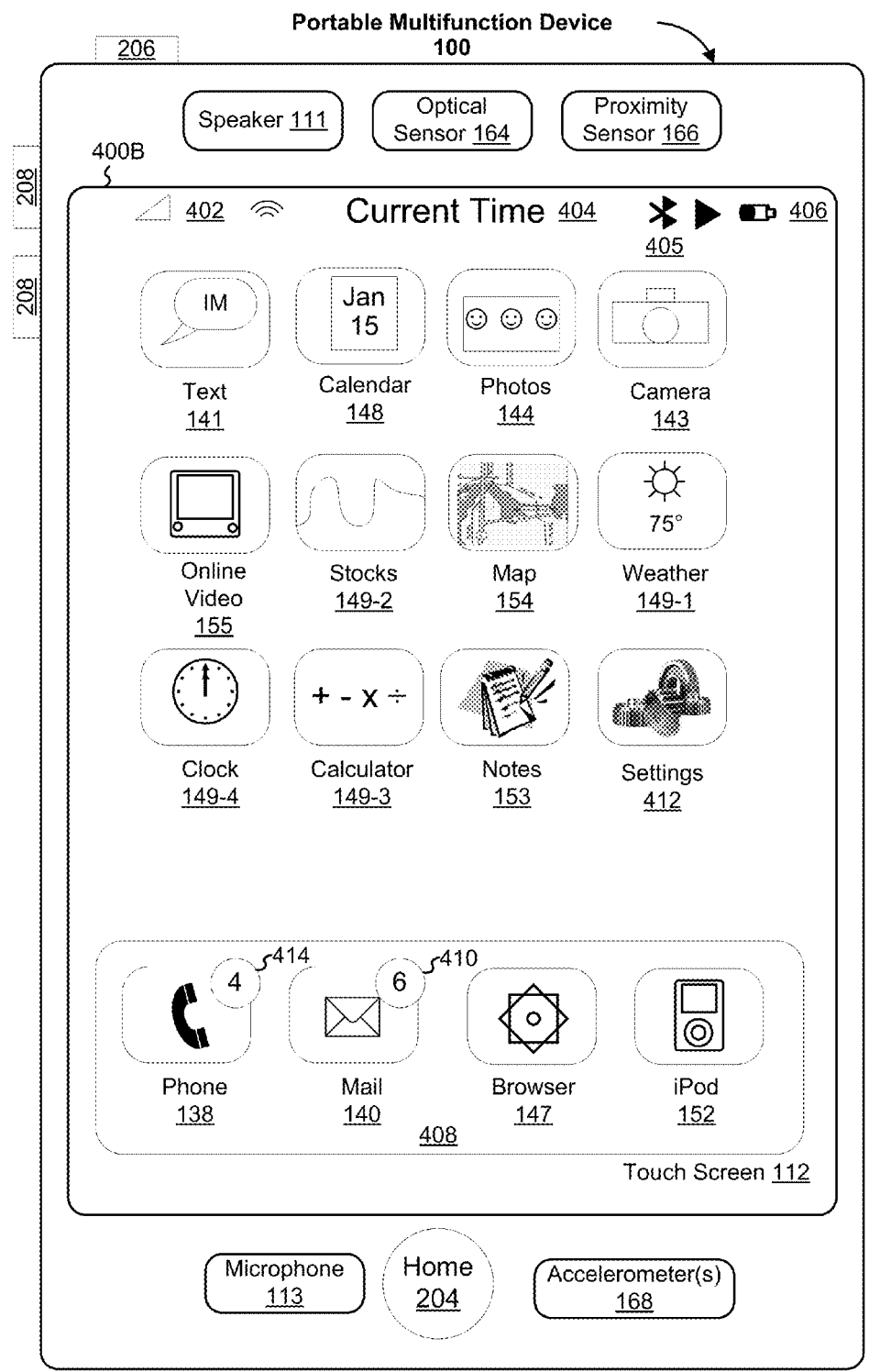

FIGS. 4A and 4B illustrate exemplary user interfaces for a menu of applications on a portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Music player 146; and Icons for other applications, such as:
  IM 141;
  Image management 144;
  Camera 143;
  Video player 145;
  Weather 149-1;
  Stocks 149-2;
  Workout support 142;
  Calendar 148;
  Calculator 149-3;
  Alarm clock 149-4;
  Dictionary 149-5; and
  User-created widget 149-6.

In some embodiments, user interface 400B includes the following elements, or a subset or superset thereof:
  402, 404, 405, 406, 141, 148, 144, 143, 149-3, 149-2, 149-1, 149-4, 410, 414, 138, 140, and 147, as described above;
  Map 154;
  Notes 153;
  Settings 412, which provides access to settings for the device 100 and its various applications 136, as described further below;
  Video and music player module 152, also referred to as iPod (trademark of Apple Inc.) module 152; and
  Online video module 155, also referred to as YouTube (trademark of Google, Inc.) module 155.

FIG. 4C illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470). In this way, user inputs (e.g., contacts 460 and 462) detected by the device on the touch-sensitive surface (e.g., 451 in FIG. 4C) are used by the device to manipulate the user interface on the display (e.g., 450 in FIG. 4C) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

FIG. 5A is a block diagram illustrating exemplary components for the event handling system 197 in accordance with some embodiments. In the discussion of FIGS. 5A and 5B, the display device 340 is a touch-sensitive display or a display that has a touch-sensitive surface. In some embodiments, memory 370 (in FIG. 3) or memory 102 (in FIGS. 1A and 1B) includes event sorter 501 (e.g., in operating system 126) and a respective application 191-1 (e.g., any of the aforementioned applications 137-151).

Event sorter 501 receives event information and determines the application 191-1 and application view 511 of application 136-1 to which to deliver the event information. Event sorter 501 includes an event monitor 502 and an event dispatcher module 505.

In some embodiments, application 191-1 includes application internal state 512, which indicates the current application view(s) 560 displayed on touch sensitive display 112 when the application is active or executing. As discussed in further detail below, an application view or user interface window is made up of controls and other elements that a user can see on the display. In some embodiments, the application internal state data 512 includes active field data 561 and displayed user interface data 562 of the current application view. Active field data 561 includes the active fields and whether the user interface or interfaces associated with the active fields are associated with at least some display behavior of standard interface objects. Displayed user interface data 562 includes which user interfaces are displayed, whether the displayed user interfaces are associated with at least some display behavior of standard interface objects and the orientation of user interfaces displayed in the current application view(s).

Application internal state 512, however, is not directly accessible by control module 190, because the memory location(s) of the application internal state 512 is(are) not known to control module 190, or the memory location(s) of the application internal state 512 is(are) not directly accessible by the control module 190, and/or because application 191-1 stores information in application internal state 512 in a manner (e.g., using data structures, formats, metadata, or the like) unknown to control module 190.

In some embodiments, application internal state 512 includes additional information, such as one or more of: resume information to be used when application 191-1 resumes execution, user interface state information that indicates information being displayed or that is ready for display by application 191-1, a state queue for enabling the user to go back to a prior state or view of application 191-1, and a redo/undo queue of previous actions taken by the user.

In some embodiments, device/global internal state 157 is used by event sorter 501 to determine which application(s) is(are) currently active, and application internal state 512 is used by event sorter 501 to determine application views 511 to which to deliver event information.

In some embodiments, application internal state 512 includes additional information, such as one or more of: resume information to be used when application 191-1 resumes execution, user interface state information that indicates information being displayed or that is ready for display by application 191-1, a state queue for enabling the user to go back to a prior state or view of application 191-1, and a redo/undo queue of previous actions taken by the user.

Event monitor 502 receives event information from peripherals interface 118. Event information includes information about a sub-event (e.g., a user touch on the touch-sensitive display device 340, as part of a multi-touch gesture). Peripherals interface 118 transmits information it receives from I/O subsystem 330 (e.g., the system keyboard 350, the custom keyboard 720 (FIG. 7A), etc.), or a sensor 164, such as proximity sensors 166, accelerometer(s) 168, and/or microphone 113 (through audio circuitry 110). Information that the peripherals interface 118 receives from I/O subsystem 106 or 330 includes information from the touch-sensitive display device 340 (i.e., a touch-sensitive display or display having a touch-sensitive surface) and sensors 164.

In some embodiments, the event monitor 502 sends requests to the peripherals interface 118 at predetermined intervals. In response, the peripherals interface 118 transmits event information. In other embodiments, peripherals interface 118 transmits event information only when there is a significant event (e.g., receiving an input beyond a predetermined noise threshold and/or for more than a predetermined duration).

In some embodiments, the event sorter 501 also includes a hit view determination module 503 and/or an active event recognizer determination module 504.

Hit view determination module 503 provides software procedures for determining where a sub-event has taken place within one or more views (e.g., the application views 511), when the touch sensitive display device 340 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

The hit view determination module 503 receives information related to sub-events of a touch-based gesture. When an application has multiple views organized in a hierarchy, the hit view determination module 503 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit-view is identified by the hit view determination module the hit view, it typically receives all sub-events related to the same touch or input source for which it was identified as the hit view.

Active event recognizer determination module 504 determines which view or views within a view hierarchy should receive a particular sequence of sub-events. In some embodiments, the active event recognizer determination module 504 determines that only the hit view should receive a particular sequence of sub-events. In other embodiments, active event recognizer determination module 504 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as the actively involved views.

The event dispatcher module 505 dispatches the event information to an event recognizer (e.g., event recognizer 520). In embodiments including the active event recognizer determination module 504, the event dispatcher module 505 delivers the event information to an event recognizer determined by the active event recognizer determination module 504. In some embodiments, the event dispatcher module 505 stores in an event queue the event the event information, which is retrieved by a respective event receiver module 531.

In some embodiments, the operating system 126 includes the event sorter 501. Alternatively, the application 191-1 includes the event sorter 501. In yet other embodiments, the event sorter 501 is a stand-alone module, or a part of another module stored in memory 370, such as contact/motion module 130.

In some embodiments, the application 191-1 includes a plurality of event handlers 522 and one or more application views 511, each of which includes instructions for handling touch events that occur with a respective view of the application's user interface. Each application view 511 of the application 191-1 includes one or more event recognizers 520. Typically a respective, an application view 511 includes a plurality of event recognizers 520. In other embodiments, one or more of the event recognizers 520 are part of a separate module, such as a user interface kit (not shown) or a higher level object from which application 191-1 inherits methods and other properties. In some embodiments, a respective application view 511 also includes event data 539. The interface information 514 includes which interfaces are currently displayed and whether each user interface is associated with display behavior of a standard user object. In some embodiments, a respective event handler 522 also includes one or more of: data updater 525, object updater 526, GUI updater 527, and/or event data 539 received from event sorter 501. Event handler 522-1 may utilize or call data updater 525, object updater 526 or GUI updater 527 to update the application internal state 512. Alternatively, one or more of the application views 511 includes one or more respective event handlers 522. Also, in some embodiments, one or more of data updater 525, object updater 526, and GUI updater 527 are included in a respective application view 511.

A respective event recognizer 520 receives event information (e.g., event data 539) from the event sorter 501 and identifies an event from the event information. The event recognizer 520 includes an event receiver 531 and an event comparator 532. In some embodiments, the event recognizer 520 also includes at least a subset of: metadata 535, event delivery instructions 536, and/or sub-event delivery instructions 537.

The event receiver 531 receives event information from the event sorter 501. The event information includes information about a sub-event, for example, a touch or a movement. Depending on the sub-event, the event information also includes additional information, such as a location (e.g., a physical location) of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 532 compares the event information to predefined event or sub-event definitions and, based on the comparison, determines an event or sub event, or determines or updates the state of an event or sub-event. In some embodiments, event comparator 532 includes event definitions 533. Event definitions 533 contain definitions of events (e.g., predefined sequences of sub-events), for example, event 1 (534-1), event 2 (534-2), and others. In some embodiments, sub-events in an event 534 include, for example, touch begin, touch end, touch cancellation, and multiple touching. In one example, the definition for event 1 (534-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (534-2) is rotating the device 100. Other examples of events include jiggling the device 100, smacking the device 100 and coming into close proximity to the device 100. In some embodiments, the event also includes information for one or more associated event handlers 522 for respective event (e.g., 534-1).

In some embodiments, an event definition 533 includes a definition of an event for a respective user-interface object. In some embodiments, the event comparator 532 performs a hit test to determine which user-interface object is associated with a sub-event. For example, in an application view in which three user-interface objects are displayed on a touch-sensitive display such as the display device 340, when a touch is detected on the display device 340, the event comparator 532 performs a hit test to determine which of the three user-interface objects is associated with the touch (sub-event). If each displayed object is associated with a respective event handler 522, the event comparator uses the result of the hit test to determine which event handler 522 should be activated. For example, the event comparator 532 selects an event handler associated with the sub-event and the object triggering the hit test.

In some embodiments, the definition for a respective event 534 also includes delayed actions that delays delivery of the event information until after it has been determined whether the sequence of sub-events does or does not correspond to the event recognizer's event type.

When a respective event recognizer 520 determines that the series of sub-events do not match any of the events in the event definitions 533, the respective event recognizer 520 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 520 includes metadata 535 with configurable properties, flags, and/or lists that indicate how the event delivery system should perform sub-event delivery to actively involved event recognizers. In some embodiments, metadata 535 includes configurable properties, flags, and/or lists that indicate how event recognizers may interact with one another. In some embodiments, metadata 535 includes configurable properties, flags, and/or lists that indicate whether sub-events are delivered to varying levels in the view or programmatic hierarchy.

In some embodiments, a respective event recognizer 520 activates an event handler 522 associated with an event when one or more particular sub-events of an event are recognized. In some embodiments, a respective event recognizer 520 delivers event information associated with the event to the event handler 522. Activating an event handler 522 is distinct from sending (and deferred sending) sub-events to a respective hit view. In some embodiments, the event recognizer 520 throws a flag associated with the recognized event, and an event handler 522 associated with the flag catches the flag and performs a predefined process.

In some embodiments, the event delivery instructions 536 includes the sub-event delivery instructions 537 that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 525 creates and updates data used in application 191-1. For example, data updater 525 updates the telephone number used in contacts module 137, or stores a video file used in video player module 145. In some embodiments, object updater 526 creates and updates objects used in application 191-1. For example, object updater 526 creates a new user-interface object or updates the position of a user-interface object. GUI updater 527 updates the GUI. For example, GUI updater 527 prepares display information and sends it to graphics module 132 for display on a touch-sensitive display.

In some embodiments, event handler(s) 522 includes or has access to data updater 525, object updater 526, and GUI updater 527. In some embodiments, data updater 525, object updater 526, and GUI updater 527 are included in a single module of a respective application 191-1 or application view 511. In other embodiments, they are included in two or more software modules.

FIG. 5B is a block diagram illustrating an event handler 522-1, according to some embodiments. The event handler 522-1 includes a control application event handler 540 and an application event handler 550. In some embodiments, the control application event handler 540 is included in the control module 190. In some embodiments, the application event handler 550 is included in an application 191. Stated another way, event handler 522-1 is implemented partially in control application 191 and partially in control module 190.

In some embodiments, the control application event handler 540 includes a query module 541, a command module 542, and a listener module 543. The modules of control application event handler 540 form an application programming interface (API) for providing display behavior to application 191 executed by device 100.

The query module 541 queries the application 191 for interface information. In some embodiments, interface information includes: displayed user interfaces, whether the displayed interface are associated with at least some display behavior of a standard interface object, the orientation of the displayed user interface, the active fields and whether the user interfaces associated with the active fields are associated with at least some display behavior of a standard device. Orientation data includes the orientation of the device and the displayed user interfaces. Interface information 544 obtained by the query module 541 is used by the control module 190 to update application internal state information 512 retained by the control module 190 for the application 191.

The interface information 544 is used by the event handler 522 to determine whether the display of the application 191 needs to be updated. For example, the interface information 544 may indicate that the orientation of a custom user (that is associated with display behavior of a standard user object) does not match the orientation of the device 100.

The command module 542 issues commands to the application 191 based on the user interface display event and the obtained interface information. As discussed above, the user interface display event is received from an event recognizer. When a user interface display event is received, the command module 542 may issues commands to the application 191 to display all of the displayed custom user interfaces (that are associated with at least some display behavior of standard user object) in accordance with display behavior for a standard user object. For example, the command module 542 may, in response to receiving an event indicating that a rotating event has occurred, instruct the application 191 to display a custom user interface object (that is associated with at least some display behavior of a standard user object) at an orientation corresponding to the orientation of the device 100. In another example, the command module 542 may, in response to receiving an event indicating that a user has selected an icon or tap an area of the display 340 to indicate that a displayed user interface is no longer required, instruct the application 191 to hide a user interface object. In yet another example, the command module 542 may instruct the application 191 to display one or more user interface objects (or icons representing one or more user interface objects) in an accessory view.

The listener module 543 listens to notifications by the application 191 (e.g., via a notification module 553 of the application 191) that the interface information 544 obtained by the control module 190 for application 191 can no longer be relied upon by the control module 190.

As discussed in more detail in the discussion FIG. 6, the control application event handler includes an input view function 545 and an accessory view function 546. The input view function replaces the appearance and functionality of a standard user interface object (that is associated with an input field) with the appearance and functionality of a custom user interface object. The accessory view function 546 associates or binds an accessory view to an input field.

In some embodiments, the application event handler 550 includes a responder module 551, a command execution module 552, and a notification module 553. The responder module 551 responds to queries by the control module 190 (e.g., from the query module 541 of the control module 190) for interface information providing information for one or more events. The command execution module 552 executes commands issued by the control module 190 (e.g., from the command module 542 of the control module 190). For example, the command execution module 552 may hide a user interface or re-display a user interface at an orientation corresponding to the orientation of the device. The notification module 553 notifies the control module 190 that the interface information obtained by the control module 190 from the application 191 can no longer be relied upon by the control module 190.

It shall be understood that the foregoing discussion regarding event handling of user touches on touch-sensitive displays also applies to other forms of user inputs to operate the device 100 with input-devices, not all of which are initiated on touch screens, such as coordinating mouse movement and mouse button presses with or without single or multiple keyboard presses or holds, user movements taps, drags, scrolls, etc., on touchpads, pen stylus inputs, movement of the device, rotation of the device, oral instructions, detected eye movements, biometric inputs, and/or any combination thereof, which may be utilized as inputs corresponding to sub-events which define an event to be recognized.

FIG. 6 illustrates pseudo code for an application 191 that uses functions defined in the API to associate a custom user interface with a standard interface object in accordance with some embodiments. An application programming interface (API) is an interface implemented by a software program to enable interaction with other software. Application programming interfaces are implemented by applications, libraries and operations systems to determine the calling conventions a programmer should employ to use their services. As discussed above, the modules of control application event handler 540 form an application programming interface for providing display behavior to application 191 executed by device 100. In some embodiments, the API includes one or more object classes for input fields that call standard user interface objects such as an on-screen keyboard. In some embodiments, the API includes one or more interface object classes for standard user interface objects such as an on-screen keyboard. In some embodiments, a super class from which input field object classes inherent from, includes one or more functions to allow a programmer to replace the appearance and functionality of a standard user object. In some embodiments, each input field object class includes one or more functions to allow a programmer to replace the appearance and functionality of a standard user object. Stated in another way, the super class of input field object class or each input field object class includes one or more functions that allow a programmer to associate a custom user interface with display behavior of a standard user object. In some embodiments, the interface object classes for user interfaces or a super class form which the user interface object class inherent from, includes one or more functions to allow a programmer to replace the appearance and functionality of a standard user object. As used herein, a function that allows a programmer to associate a custom user interface with display behavior of a standard user object by replacing the appearance and functionality of a standard user interface object is called is called a "input view" function. In some embodiments, the control application event handler 540 for control module 190 includes the input view function (e.g., 545, FIG. 5B).

FIG. 6 provides an illustration of pseudo code that calls an "input view" function. As shown in FIG. 6, a programmer may instantiate a standard text field object that calls a standard user interface object (i.e., "UITextField*dateField= [[UITextField alloc] initWithFrame:frame];" 602) and then set the input view of the standard user interface object to a custom user interface created by the programmer (i.e., dateField.inputView=[MyDatePickerView sharedCustom-DatePicker];" 604). In this example, "dateField" 610 is a standard input field/icon that calls a standard user object, "inputView" 608 is a function that allows a programmer to replace the appearance and functionality of the standard user object, and "MyDatePickerView sharedCustomDatePicker" 606 is a custom user interface created by a programmer. In other words, the line of code 604, replaces the appearance and functionality of a standard user object with that of a custom user interface. Stated in another way, the line of code 604 associates a custom user interface with display behavior of a standard user object. As a result, the standard user interface will appear and function like a custom user interface while retaining all other functionality of the standard user interface such as display behavior. The display behavior of the custom user interface (i.e., "sharedCustomDatePicker" 606) will be controlled by the system (i.e., the control module 190) and the appearance and functionality of the custom interface will be controlled by the application (i.e., application 191). An advantage of utilizing the "input view" function is that a programmer does not have to specify the display behavior of the custom user interface thereby saving development time and providing the user with a user interface that is displayed in a predictable manner. In some embodiments, the control application event handler 540 for control module 190 includes the accessory view function (e.g., 546, FIG. 5B).

FIG. 6 provides an illustration of pseudo code that calls an "accessory view" function. In some embodiments, the super class of the input field object classes or each input field object class includes one or more functions that allow a programmer to associate a plurality of user interfaces with an input field/icon. The interfaces may be custom user interfaces or standard user interfaces. As used herein, a function that allows a programmer to associate a plurality of custom user interfaces with an input field is called an "accessory view" function. As shown in FIG. 6, a programmer may instantiate a text field (i.e., "UITextField*dateField2=[[UITextField alloc] init-WithFrame:frame];" 603) and then set the accessory view of the text field to multiple interfaces (i.e., dateField.accessory-View=[MyDatePickerView multipleViews];" 605). In this example, "dateField2" 614 is a standard input field such as a text field that calls a standard user object, "accessoryView" 612 is a function that allows a programmer to associated multiple user interfaces (i.e., "multipleViews" 616). In some embodiments, when the text field is activated by a user, an accessory view is displayed. The accessory view (e.g., 736, FIG. 7D), displays icons (e.g., 730, 732 or 734, FIG. 7D) or representations of user interfaces that a user can select from. In some embodiments, the user interfaces associated with an accessory view are displayed in accordance with the display behavior of a standard interface object. In other words, the control module 190 controls the display behavior of the user interfaces selected from an accessory view.

Attention is now directed towards embodiments of user interfaces ("UI") and associated processes that may be implemented on a multifunction device with a display and a touch-sensitive surface, such as device 300 or portable multifunction device 100.

FIGS. 7A-7E illustrate exemplary user interfaces in accordance with some embodiments. The user interfaces in these figures are used to illustrate the processes described below, including the processes in FIGS. 8A and 8B.

Figure 7A:
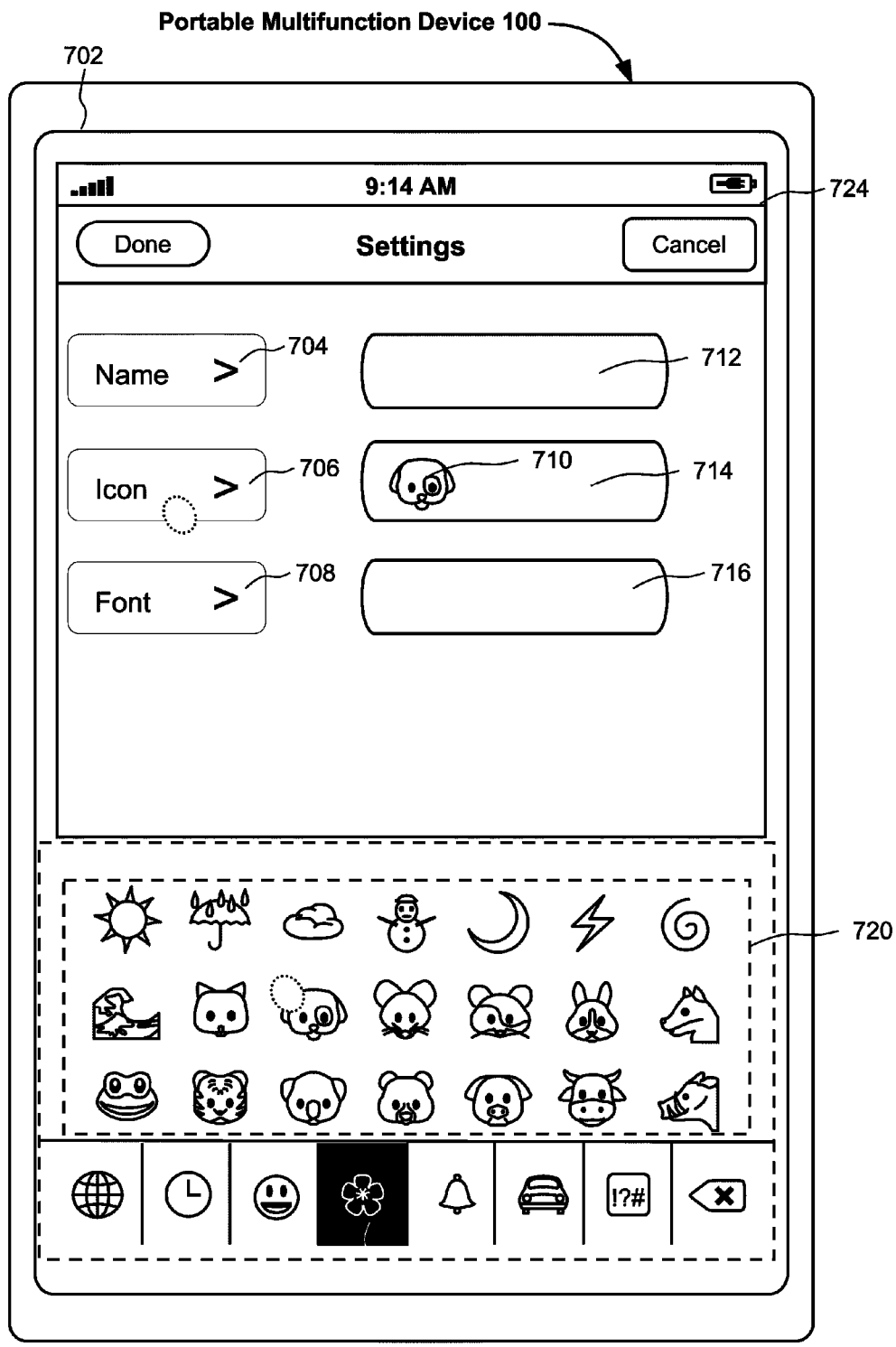

FIG. 7A illustrates a portable multifunction device 100 that is in a portrait orientation and is displaying the interface of an application 724 on display 702. The application interface includes a plurality of icons/input icons (i.e., 704, 706 and 708), a plurality of input fields (i.e., 712, 714 and 716), and a custom user interface 720. Field 714 displays an icon 710 that was selected from the custom user interface 720. In this figure, custom user interface 720 is associated with display behavior of a standard interface object such as an on-screen keyboard. As discussed in greater detail below, the custom user interface 720 is displayed at a location and orientation based on display behavior of a standard interface object.

FIG. 7B illustrates a portable multifunction device 100 that is in a landscape orientation and is displaying the interface of application 724. As discussed in greater detail below, the custom user interface 720 is displayed at a location and an orientation determined by the control module 190.

Figure 7C:
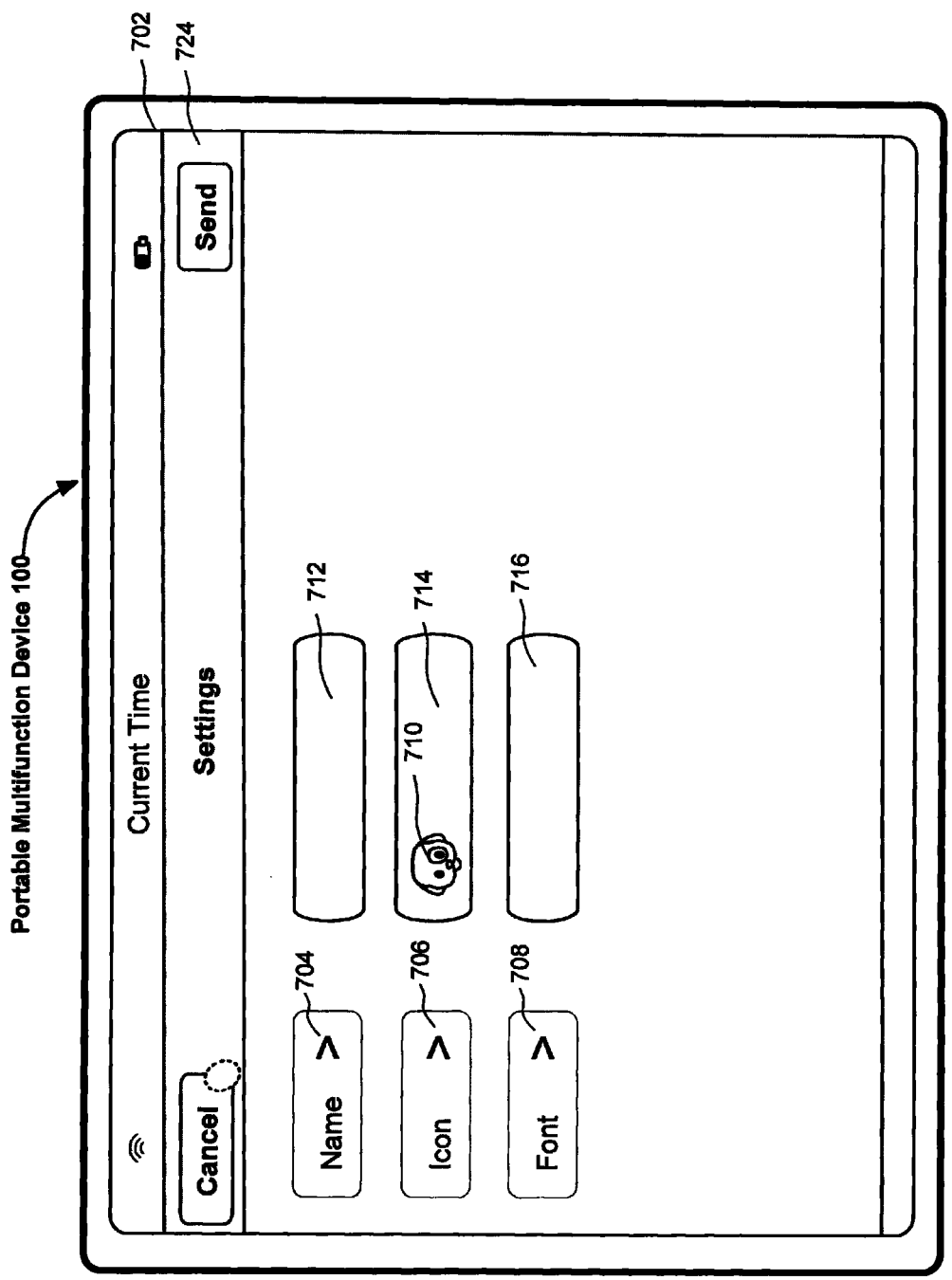

FIG. 7C illustrates a portable multifunction device 100 that is in a landscape orientation and is displaying the interface of application 724. In this figure, the custom user interface 720 is hidden. As discussed in greater detail below, the control module 190 determines when the custom user interface 720 is hidden.

Figure 7D:
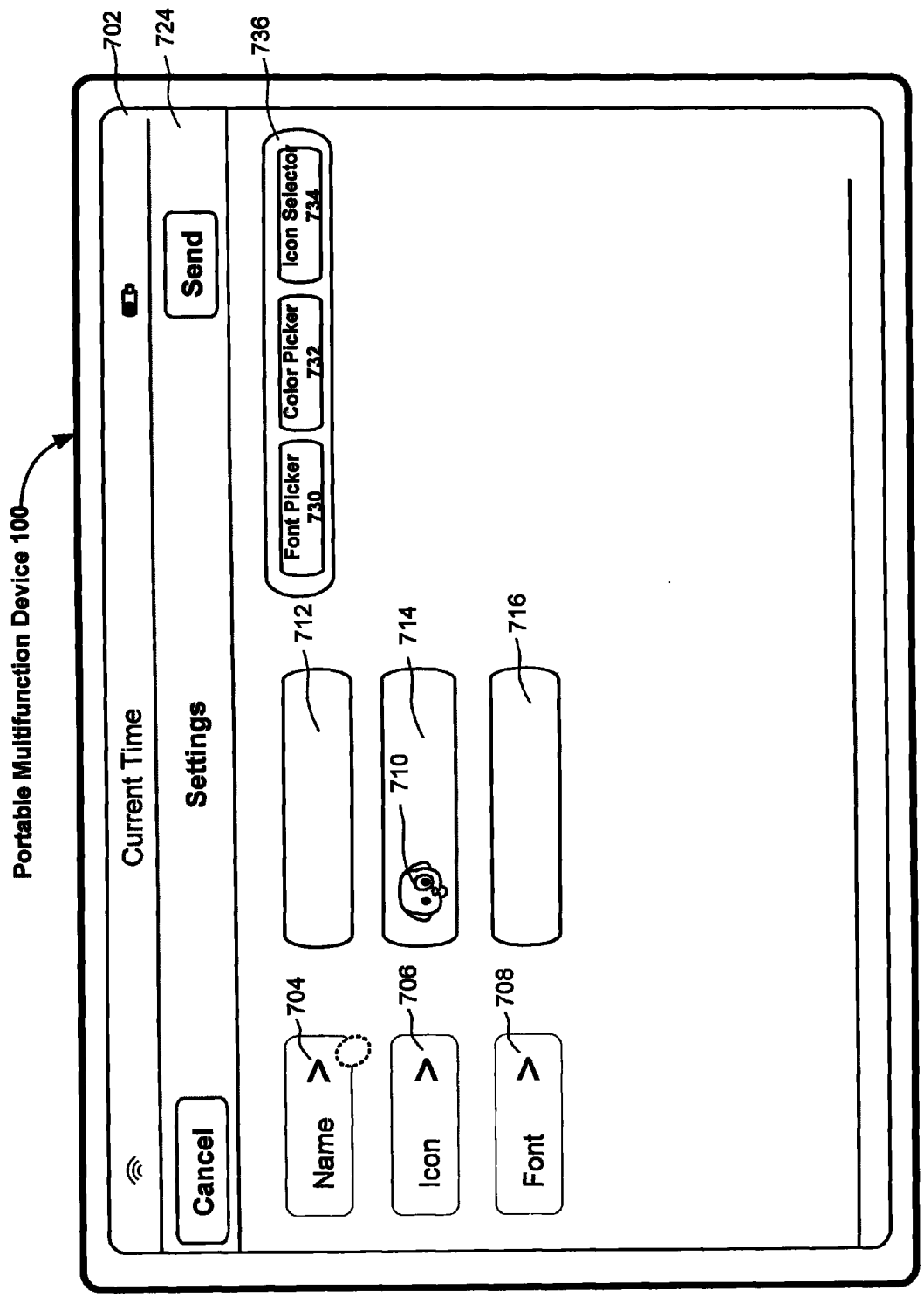

FIG. 7D illustrates a portable multifunction device 100 in a landscape orientation and is displaying the interface of application 724. Input field 712 is associated with an accessory view 736. In some embodiments, the accessory view is associated with the icon 704 and/or field 712. The accessory view includes a font picker icon 730, a color picker icon 732 and an icon selector icon 734. Each icon (i.e., 730, 732 and 734) corresponds to a selectable user interface. The corresponding user interface is displayed in response to a user selection. The corresponding user interfaces may be standard interface objects or custom interface objects. In some embodiments, the corresponding user interface is displayed in accordance with display behavior of a standard user object.

Figure 7E:
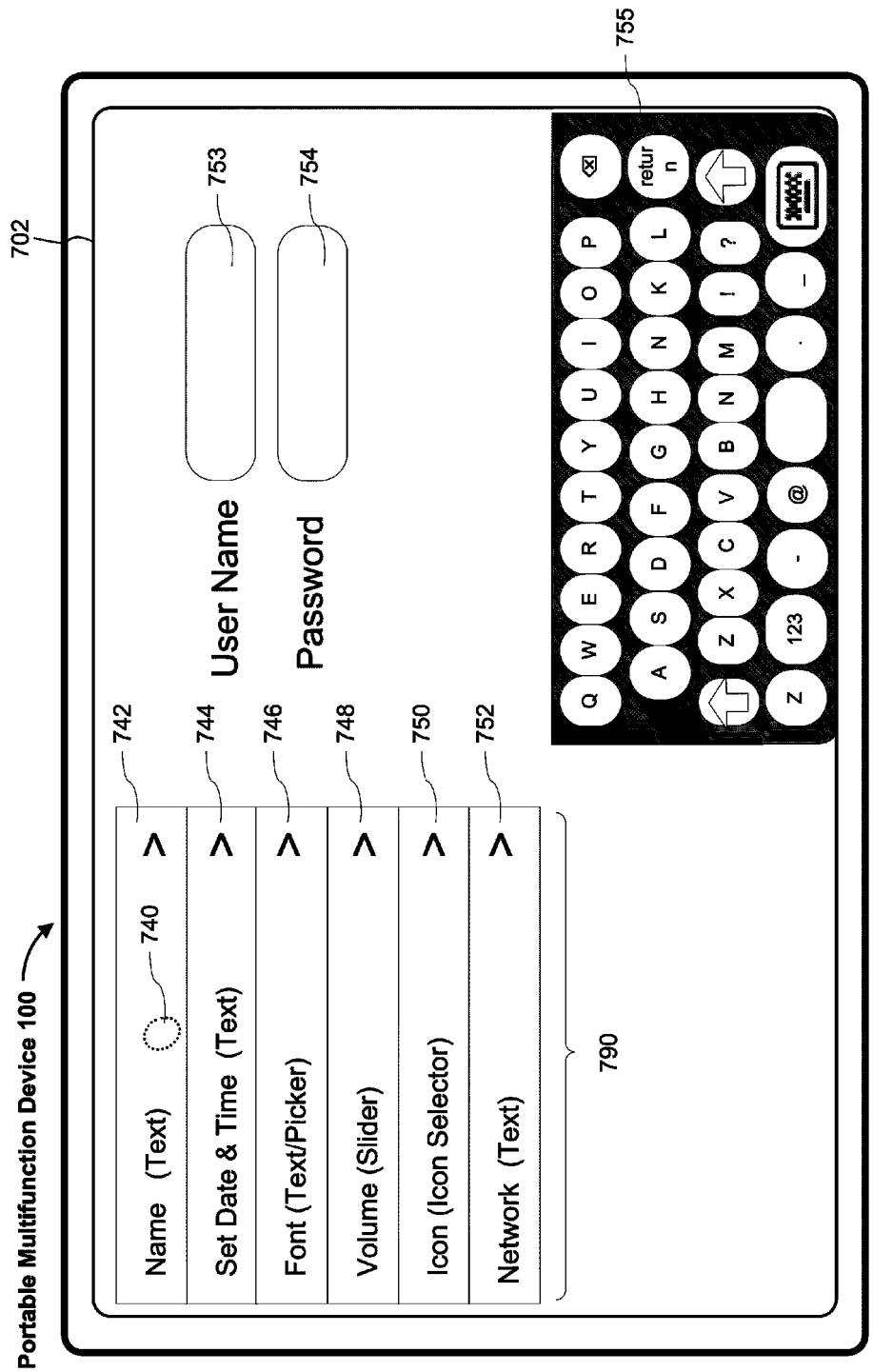

FIG. 7E illustrates a portable multifunction device 100 displaying multiple exemplary input fields 790 on a display 702. Each field is associated with one or more user interface objects. For example, Set Date & Time field 744 is associated with a text, Font field 746 is associated with a text/picker, Volume field 748 is associated with a slider, Icon field 750 is associated with an icon selector, and Network field 752 is associated with a text. In some embodiments, a user interface associated with the field is displayed in response to user selection of the field. The user interfaces may be custom user interfaces specific to an application or standard user interfaces supplied by the device 100. In some embodiments, the input fields 790 are displayed in response to execution of one or more applications 136 (FIG. 1B) or other applications. For example, the fields 790 could be associated with a settings menu associated with a particular application, such as a media player application or an email application. In FIG. 7E, the dashed circle 740 corresponds to a finger contact with the touch sensitive display. As shown in FIG. 7E, a "User Name" field 753, a "Password" field 754 and an on-screen keyboard 755 are displayed in response to selection 740 of the "Name" field 742. The on-screen keyboard 755 may be used to input one or more text characters into the fields 753 and 754. In some embodiments, the standard user interface objects and custom user interface objects associated with at least some display behavior of a standard user interface objects are displayed in accordance with the display behavior of standard user interface objects. In some embodiments, the standard user interface objects and custom user interface objects associated with at least some display behavior of a standard user interface objects are displayed in accordance with display behavior of a user interface object described in U.S. patent application Ser. No. 12/789,666, "Automatically Hiding and Displaying an On-screen Keyboard," filed May 28, 2010.

Figure 8A:
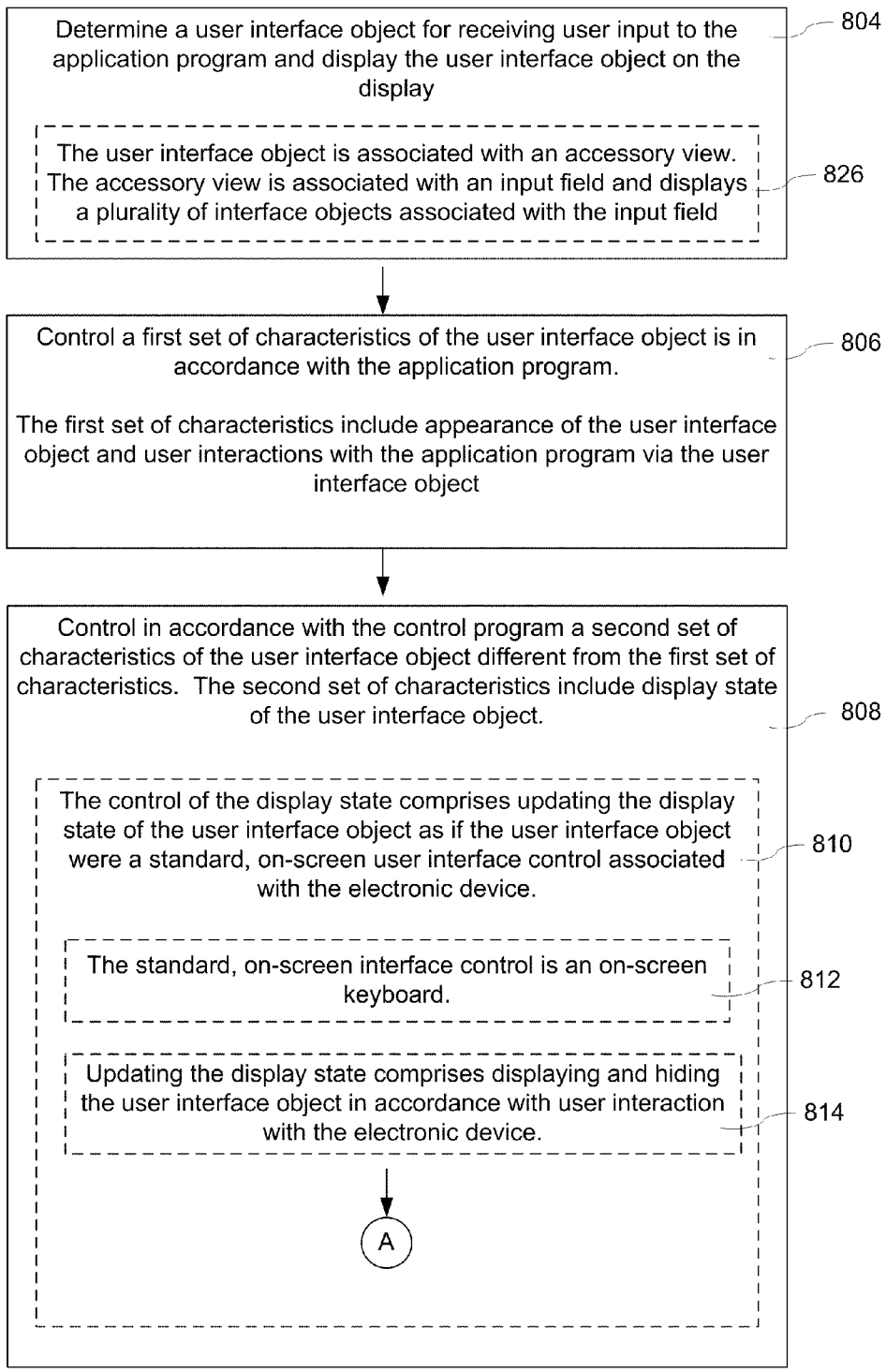
FIGS. 8A-8B are flow diagrams illustrating a method of 800 in accordance with some embodiments.
Figure 8B:
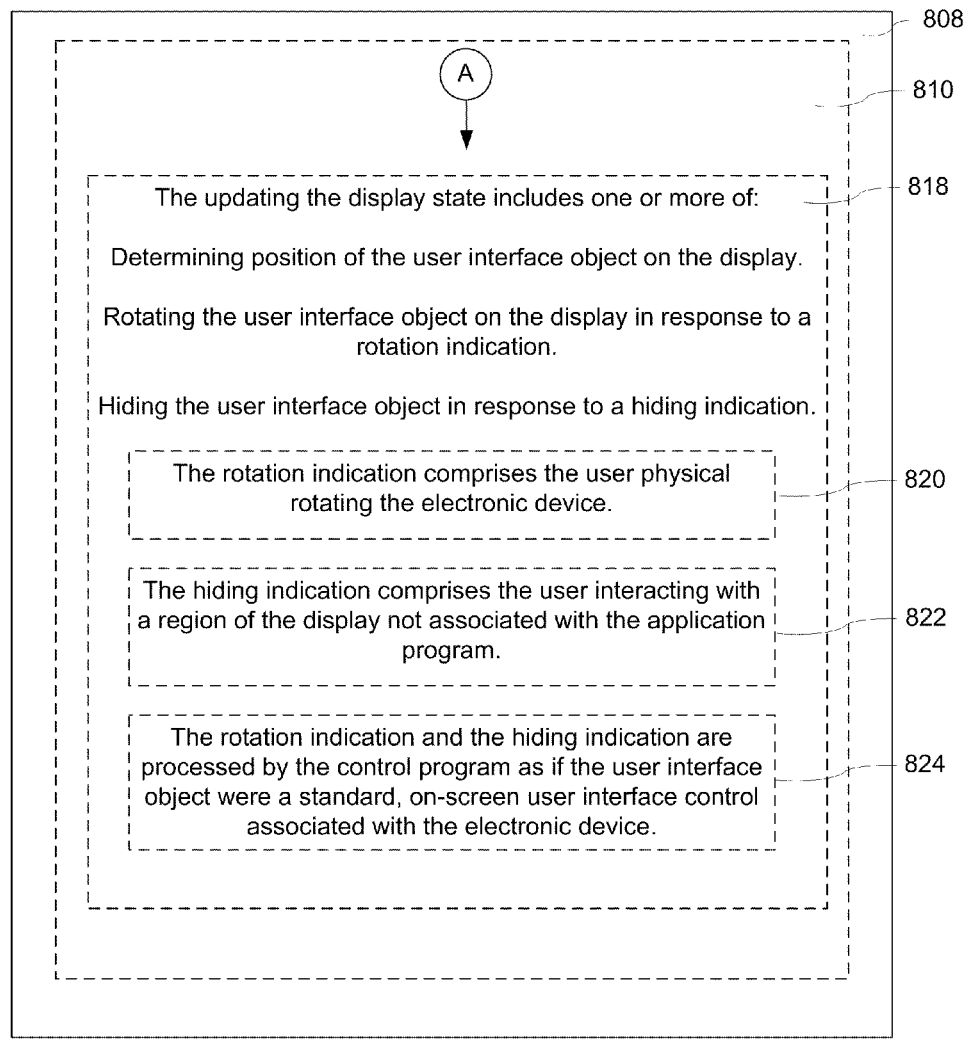

FIGS. 8A and 8B are flow diagrams illustrating a method 800 of displaying a custom interface object with the display behavior of a standard interface object in accordance with some embodiments. The method 800 is performed at an electronic device (e.g., device 300, FIG. 3, or portable multifunction device 100, FIG. 1) with one or more processors, memory, a display and a touch-sensitive surface. In some embodiments, the display is a touch screen display and the touch-sensitive surface is on the display. In some embodiments, the display is separate from the touch-sensitive surface. Some operations in method 800 may be combined and/or the order of some operations may be changed.

As described below, the method 800 provides a way to display a custom interface object with the display behavior of a standard interface object such as an on-screen keyboard. The method allows a programmer to create a custom interface object without needing to program all aspects of the custom interface object's display behavior thereby reducing the programmer's development time. Programmers may desire that their custom interfaces are displayed in accordance with a standard interface object so that their interfaces are predictable to users.

In accordance with some embodiments, a computer-implemented method is performed at an electronic device that includes one or more processors, a touch-screen display, and memory storing one or more programs including an application program and a control program. A user interface object for receiving user input to the application program is detected and the user interface object is displayed on the display (804). In some embodiments, it is determined whether an input field is associated with an interface object that is associated with at least some display behavior of a standard user interface object. In some embodiments, the input field is an active input field that a user has selected. In some embodiments, the control module 190 determines the user interface object by way of the event handling system 197. In some embodiments, the user interface object is determined in response to a user action. For example, the user interface object may be determined when a user selects an input field that requires the user interface object. In some embodiments, the user interface object is selected from a group consisting of sliders, virtual knobs, virtual wheels, virtual joysticks, selection boxes, and on-screen keyboards. For example, as shown in FIG. 7A, a user input object may be an icon selector 720.

A first set of characteristics of the user interface object is controlled in accordance with the application program (806). The first set of characteristics include appearance of the user interface object and user interactions with the application program via the user interface object (806). In other words, the application determines the visual appearance of the user interface object and how a user interacts with the user interface object. For example, as shown in FIG. 7A, an icon selector 720 may be represented as a box with a plurality of icons. In this example, as shown in FIG. 7A, when a user selects an icon 710, the icon is displayed in field 714. In some embodiments, the first set of characteristics are defined in the application program. The some embodiments, application program is a user created application 191 and the user interface object is a custom user interface object 193.

A second set of characteristics of the user interface object different from the first set of characteristics is controlled in accordance with the control program. The second set of characteristics include display state of the user interface object (808). In some embodiments, the control of the display state comprises updating the display state of the user interface object as if the user interface object were a standard, on-screen user interface control associated with the electronic device (810). In other words, the control program controls the display behavior of the user interface object of the application program. In some embodiments, the standard, on-screen interface control is an on-screen keyboard (812). In some embodiments, the control program is the control module 190. In some embodiments, the control module 190 issues display instructions to the application program for application program to use when displaying the user interface object. In some embodiments, the control module 190 issues display instruction to the application program by way of the event handling system 197.

In some embodiments, updating the display state comprises displaying and hiding the user interface object in accordance with user interaction with the electronic device (814). In some embodiments, the user interaction is a user selection of an icon. For example, as shown in FIG. 7C, the user interface object 720 (FIG. 7B) may be hidden in response to user selection of an icon. In some embodiments, the user interaction is user selection of an area of the display 112 that does not include the user interface object. In some embodiments, the interaction includes, jiggling or smacking the device 100.

Updating of the display state includes one or more of determining position of the user interface object on the display, rotating the user interface object on the display in response to a rotation indication, and hiding the user interface object in response to a hiding indication (818). In some embodiments, the rotation indication comprises the user physical rotating the electronic device (820). For example, the electronic device may be rotated from a portrait to landscape orientation or vice versa. When the electronic device is rotated, the interface object is displayed in accordance with the orientation of the electronic device. For example, as shown in FIG. 7A, the device 100 is in a portrait orientation and the user interface object 720 is also shown in a portrait orientation. As shown in FIG. 7B, the device 100 is in a landscape orientation and the user interface object is also shown in a landscape portrait orientation.

In some embodiments, hiding indication comprises the user interaction with a region of the display not associated with the application program (822). In some embodiments, the rotation indication and the hiding indication are processed by the control program as if the user interface object were a standard, on-screen user interface control associated with the electronic device (824).

In some embodiments, the user interface object is associated with an accessory view (826). The accessory view is associated with an input field and displays a plurality of interface object associated with the input field (826). An accessory view allows a programmer to associate multiple user interface objects with an icon or input field. In some embodiments, an accessory view is displayed when a user selects an icon or input field. The accessory view, as shown in FIG. 7D, display icons (e.g., 730, 732 or 734) or representations of user interfaces that a user can select from. In some embodiments, the user interfaces associated with an accessory view are displayed in accordance with the display behavior of a standard interface object. In other words, the control program 190 controls the display behavior of the user interface selected from an accessory view.

The steps in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
identifying that at least one input field of a user interface of an application corresponds to an accessory view that is associated with a plurality of user interface controls;
receiving a selection of one user interface control of the plurality of user interface controls, wherein the selected user interface control is a customized user interface control specific to the application residing on a computing device, and the selected user interface control is associated with:
a first set of characteristics associated with a customized appearance of the selected user interface control, and
a second set of characteristics associated with a display state of the selected user interface control based on, at least in part, a display behavior of a standard user interface control;
detecting whether the customized appearance of the selected user interface control replaces an appearance of the standard user interface control associated with the at least one input field, wherein the standard user interface control is not specific to any application on the computing device; and in response to the detecting:
controlling the first set of characteristics of the selected user interface control in accordance with the application,
retrieving display behavior data associated with the standard user interface control, wherein the display behavior data comprises one or more display behavior rules for the standard user interface control, and each display behavior rule of the one or more display behavior rules specifies an event associated with the computing device and a corresponding display action associated with the standard user interface control, and
controlling the second set of characteristics of the selected user interface control in accordance with the display behavior data associated with the standard user interface control.

2. The computer-implemented method of claim 1, wherein controlling the second set of characteristics comprises updating the display state of the selected user interface control as if the selected user interface control were a standard, on-screen user interface control.

3. The computer-implemented method of claim 2, wherein the standard, on-screen interface control comprises an on-screen keyboard.

4. The computer-implemented method of claim 2, wherein updating the display state comprises displaying and hiding the selected user interface control in accordance with an user interaction event.

5. The computer-implemented method of claim 2, wherein updating the display state includes:
in response to a rotation event:
determining a position of the selected user interface control within the user interface, and
rotating the selected user interface control within the user interface based on the position.

6. The computer implemented method of claim 5, wherein the rotation event comprises a user physically rotating the computing device.

7. The computer-implemented method of claim 2, wherein updating the display state includes hiding the selected user interface control in response to a hiding event.

8. The computer-implemented method of claim 7, wherein the hiding event comprises a user interacting with a region of the user interface that is not associated with the application.

9. The computer-implemented method of claim 1, further comprising, prior to identifying that the at least one input field corresponds to the accessory view:
displaying the user interface; and
receiving a selection of the at least one input field.

10. A portable electronic device, comprising:
a processor, configured to carry out steps that include:
identifying that at least one input field of a user interface of an application corresponds to an accessory view that is associated with a plurality of user interface controls;
receiving a selection of one user interface control of the plurality of user interface controls, wherein the selected user interface control is a customized user interface control specific to the application residing on the portable electronic device, and the selected user interface control is associated with:
a first set of characteristics associated with a customized appearance of the selected user interface control, and
a second set of characteristics associated with a display state of the selected user interface control based on, at least in part, a display behavior of a standard user interface control;
detecting whether the customized appearance of the selected user interface control replaces an appearance of the standard user interface control associated with the at least one input field, wherein the standard user interface control is not specific to any application on the portable electronic device; and
in response to the detecting:
controlling the first set of characteristics of the selected user interface control in accordance with the application,
retrieving display behavior data associated with the standard user interface control, wherein the display behavior data comprises one or more display behavior rules for the standard user interface control, and each display behavior rule of the one or more display behavior rules specifies an event associated with the portable electronic device and a corresponding display action associated with the standard user interface control, and
controlling the second set of characteristics of the selected user interface control in accordance with the display behavior data associated with the standard user interface control.

11. The portable electronic device of claim 10, wherein controlling the second set of characteristics comprises updating the display state of the selected user interface control as if the selected user interface control were a standard, on-screen user interface control.

12. The portable electronic device of claim 11, wherein updating the display state includes:
in response to a rotation event:
determining a position of the selected user interface control within the user interface, and
rotating the selected user interface control within the user interface based on the position.

13. The portable electronic device of claim 12, wherein the rotation indication event comprises a user physically rotating the portable electronic device.

14. The portable electronic device of claim 11, wherein updating the display state includes hiding the selected user interface control in response to a hiding event.

15. The portable electronic device of claim 14, wherein the hiding event comprises a user interacting with a region of the user interface that is not associated with the application.

16. A computer readable storage medium configured to store instructions that, when executed by a processor included in a computing device, cause the computing device to carry out steps that include:
identifying that at least one input field of a user interface of an application corresponds to an accessory view that is associated with a plurality of user interface controls;
receiving a selection of one user interface control of the plurality of user interface controls, wherein the selected user interface control is a customized user interface control specific to the application residing on the computing device, and the selected user interface control is associated with:
a first set of characteristics associated with a customized appearance of the selected user interface control, and
a second set of characteristics associated with a display state of the selected user interface control based on, at least in part, a display behavior of a standard user interface control;
detecting whether the customized appearance of the selected user interface control replaces an appearance of the standard user interface control associated with the at least one input field, wherein the standard user interface control is not specific to any application on the computing device; and in response to the detecting:

controlling the first set of characteristics of the selected user interface control in accordance with the application, retrieving display behavior data associated with the standard user interface control, wherein the display behavior data comprises one or more display behavior rules for the standard user interface control, and each display behavior rule of the one or more display behavior rules specifies an event associated with the computing device and a corresponding display action associated with the standard user interface control, and controlling the second set of characteristics of the selected user interface control in accordance with the display behavior data associated with the standard user interface control.

17. The computer readable storage medium of claim 16, wherein controlling the second set of characteristics comprises updating the display state of the selected user interface control as if the selected user interface control were a standard, on-screen user interface control.

18. The computer readable storage medium of claim 17, wherein updating the display state comprises displaying and hiding the selected user interface control in accordance with a user interaction event.

19. The computer readable storage medium of claim 17, wherein updating the display state includes:

in response to a rotation event:

determining a position of the selected user interface control within the user interface, and rotating the selected user interface control within the user interface based on the position.

20. The computer readable storage medium of claim 19, wherein the rotation event comprises a user physically rotating the computing device.

\* \* \* \* \*